(12) United States Patent
Babchuk

(10) Patent No.: US 6,367,788 B1
(45) Date of Patent: Apr. 9, 2002

(54) WORKPIECE SUPPORT APPARATUS

(76) Inventor: Clayton Dean Babchuk, P.O. Box 977, Blackfalds, Alberta (CA), T0M 0J0

( * ) Notice: Subject to any disclaimer, the term of this patent is extended or adjusted under 35 U.S.C. 154(b) by 0 days.

(21) Appl. No.: 09/747,060

(22) Filed: Dec. 20, 2000

(30) Foreign Application Priority Data

Oct. 30, 2000 (CA) .............................................. 2324820

(51) Int. Cl.⁷ ................................................ B25B 1/20
(52) U.S. Cl. ........................... 269/45; 29/281.1; 269/60
(58) Field of Search .............................. 269/45, 60, 43; 29/281.1

(56) References Cited

U.S. PATENT DOCUMENTS

| | | | | |
|---|---|---|---|---|
| 288,035 A | * | 11/1883 | Dixon | 269/45 |
| 3,827,126 A | * | 8/1974 | Shiozawa et al. | 269/45 |
| 4,691,905 A | * | 9/1987 | Tamura et al. | 269/45 |
| 5,040,716 A | * | 8/1991 | Stetz | 269/95 |
| 5,401,010 A | * | 3/1995 | Haswell et al. | 269/45 |
| 5,816,568 A | * | 10/1998 | Fox | 269/60 |

* cited by examiner

*Primary Examiner*—Joseph J. Hail, III
*Assistant Examiner*—Lee Wilson
(74) *Attorney, Agent, or Firm*—Davis & Bujold, P.L.L.C.

(57) ABSTRACT

A workpiece support apparatus includes an elongate primary body having several height adjustable primary support columns which extend vertically from the primary body. One or more arms extend radially from and are pivotally secured to the primary body. The arms pivot about a substantially vertical axis for angular adjustment on a substantially horizontal plane. At least two height adjustable secondary support columns extend vertically from each arm. The workpiece support apparatus is particular adapted for use by welders when welding pipe to form complex branch structures.

36 Claims, 22 Drawing Sheets

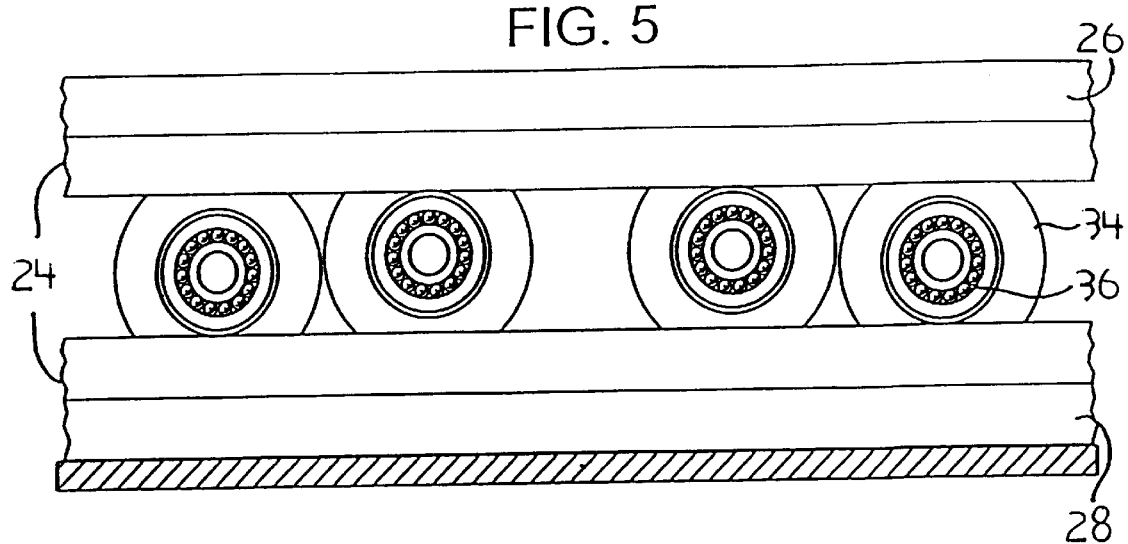
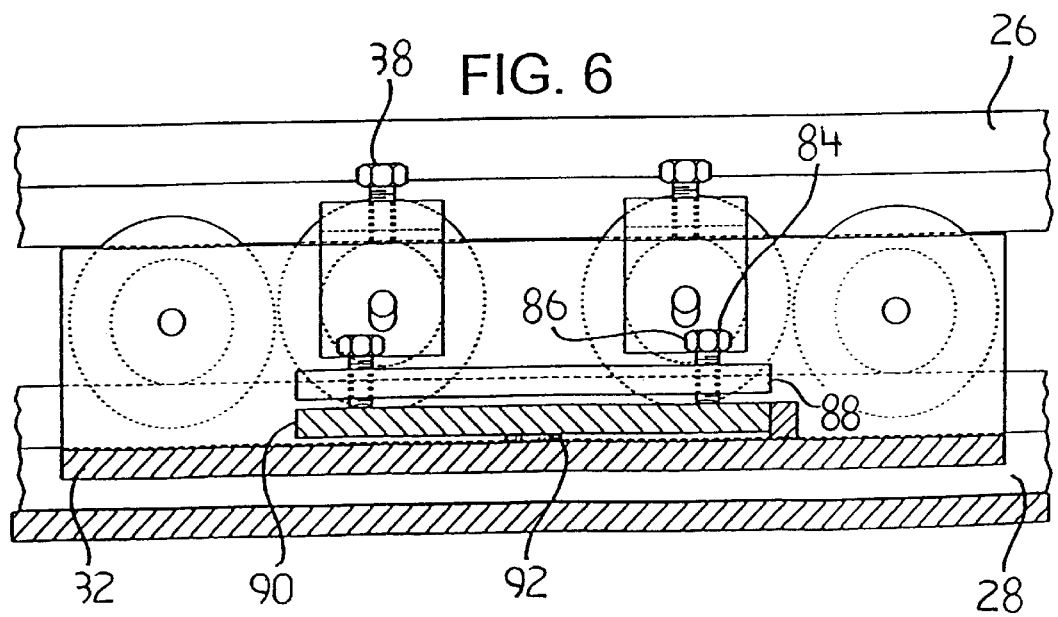

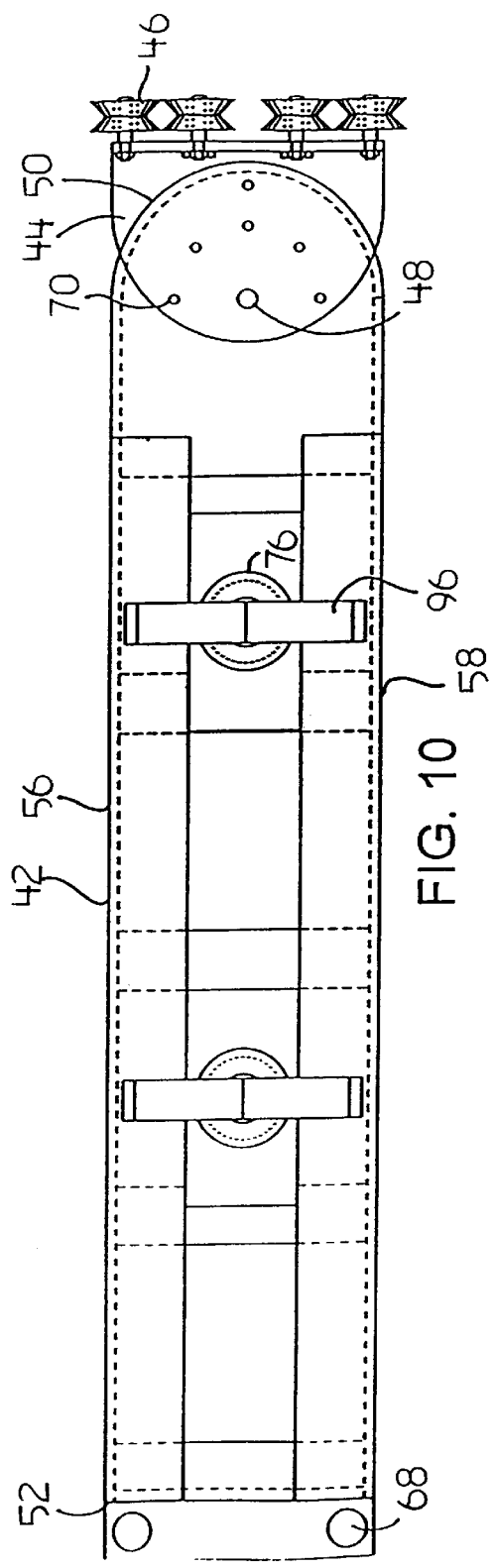
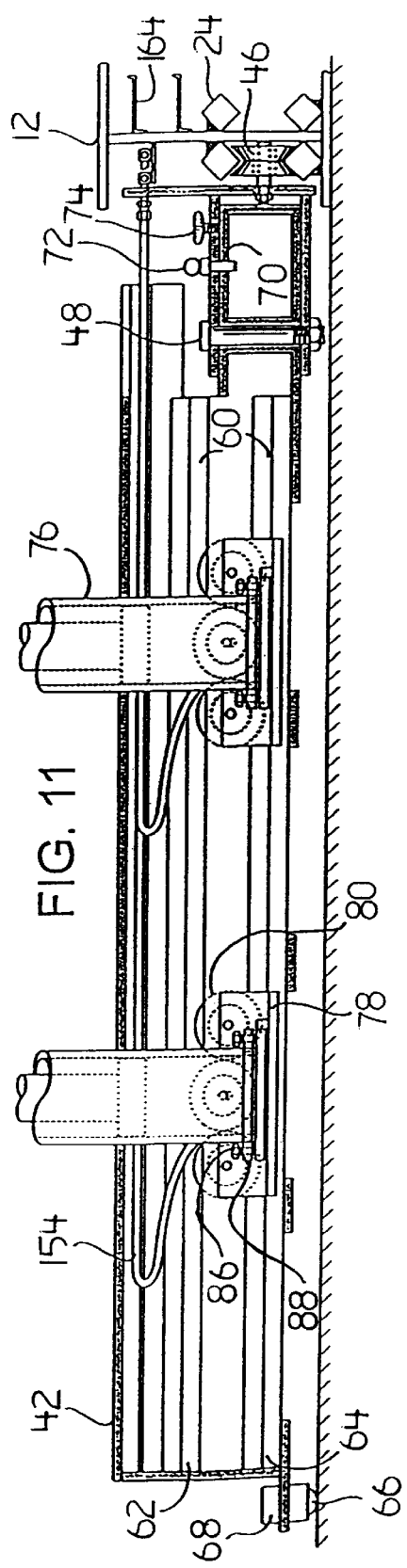

WORKPIECE SUPPORT APPARATUS

FIELD OF THE INVENTION

The present invention relates to a workpiece support apparatus and, in particular, a workpiece support apparatus suitable for use in welding complex branch structures.

BACKGROUND OF THE INVENTION

One example of an application in which complex branch structures are welded is in the fabrication of piping for connecting various processing units in a processing plant. The piping generally consists of numerous primary or trunk lines having a myriad of secondary or branch lines. The secondary lines are fabricated to intersect the primary lines at varying angles and from varying elevations. The fabrication must be precise, or the piping will not line up during on site assembly.

SUMMARY OF THE INVENTION

What is required is a workpiece support assembly which can be used to support a workpiece during welding and assembly of such complex branch structure.

According to the present invention there is provided a workpiece support apparatus which includes an elongate primary body having several height adjustable primary support columns which extend vertically from the primary body. One or more arms extending radially from and are pivotally secured to the primary body. The arms pivot about a substantially vertical axis for angular adjustment on a substantially horizontal plane. At least two height adjustable secondary support columns extend vertically from each arm.

With the workpiece support apparatus, as described above, a pipe intended to serve as a primary or trunk line is supported on the primary support columns. A pipe intended to serve as a secondary or branch line is supported on the secondary support columns. The arm is adjusted to the correct angle of intersection of the trunk line with the branch line. The heights of both the primary support columns and the secondary support columns are adjusted to ensure that the intersection of the trunk line with the branch line is at the required elevation. With the workpiece support apparatus at the proper setting, the workpiece is held securely while the workpiece is welded to joint the branch line to the trunk line. As the complexity of the workpiece is increased, additional arms can be added to accommodate further branches.

Although beneficial results may be obtained through the use of the workpiece support apparatus, as described above, the positions at which support is required will vary to some degree with the configuration of the workpiece. Even more beneficial results may, therefore, be obtained when the some or all of the primary support columns and the secondary support columns are axially movable along the primary body. This enables the support columns to be positioned as required. The manner in which the support columns are made to be movable can vary. Beneficial results have been obtained by using tracks and providing each support column with a base that has rollers, as will hereinafter be further described; although other engagements may also be functional.

In order to avoid the need for manual adjustment, it is preferred that the support columns take the form of fluid activated telescopically extendible cylinders provided with fluid through fluid lines. In view of the number of support columns involved this creates a number of problems which have been addressed through series of innovations. In order to address the problem of supplying fluid to fluid lines which must be changed in length as the positioning of the support posts changes the fluid lines extending from each of the primary support columns are connected to a rotary fluid manifold. Upon rotation of the rotary fluid manifold in a first direction fluid lines are wound onto the rotary fluid manifold. Upon rotation of the rotary fluid manifold in a second direction fluid lines are fed from the rotary fluid manifold. Each support column as two fluid lines, an inflow line and an outflow line. In order to avoid having the fluid lines pinched or damaged, a plurality of direction altering rollers are used to route the fluid lines along the primary body and each of the arms. In order to avoid entanglement of the fluid lines, each of the fluid lines is segregated by means of radially extending dividers positioned on the rotary fluid manifold. In order to ensure that slack does not develop in the fluid lines which could result in them becoming pinched, rotation of the rotary fluid manifold is controlled by a spring loaded recoiler.

The quality of the final welds of the workpiece is, in part, dependent upon how precisely the workpiece is held by the workpiece support apparatus. Even more beneficial results may, therefore, be obtained when means is provided for levelling each of the primary support columns. Beneficial results have been obtained through the use of a screw levelling adjustment, as will hereinafter be further described, although other forms of levelling adjustment may also be functional. Even more beneficial results may, therefore, be obtained when means are provided for aligning each of the primary support columns axially along the primary body. Beneficial results have been obtained through laser alignment, although other forms of alignment may also be functional.

It is preferred that each arm be readily movable and be capable of being locked in the preselected position. Movement of the arms is effected by providing each arm with underlying rollers. Once in position, means are provided, in the form of locking pins, for locking the arms in a selected angular position. There is a limit to the amount of weight that rollers can bear. Even more beneficial results may, therefore, be obtained when each of the underlying rollers are spring mounted to a housing. The rollers have an extended position extending from the housing and a retracted position retracted within the housing. The rollers are normally in the extended position, however, the rollers assume the retracted position when a load is applied that overcomes the biasing force of the spring mounting.

Although beneficial results may be obtained through the use of the workpiece support apparatus, as described above, even more beneficial results may be obtained when each support columns has a top mounting adaptor adapted to receive a workpiece engaging member. This enables several alternative workpiece engaging members having differing support characteristics to be used, as will hereafter be further described. For example, with a pipe a "V" shaped workpiece engaging member is most appropriate. With a horizontal flange face, a table style workpiece engaging member is most appropriate. With a vertical flange face, a mounting bar attachment having projecting pins with adjustable pin spacing is most appropriate. In some situations, the workpiece engaging member may be in need of support. In such situations a rigidifying frame can be provided. Even more beneficial results may be obtained when each of the support columns has longitudinally extending grooves. These longitudinally extending grooves receive bars of the rigidifying frame to provide lateral stability to the workpiece engaging member when mounted on the top mounting adaptor.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

FIG. 5 is a side elevation view of one of the tracks from the workpiece support apparatus illustrated in FIG. 1.

FIG. 6 is a side elevation view, in section, of the workpiece support apparatus illustrated in FIG. 1, showing track and roller detail, as well as support column levelling detail.

FIG. 10 is a top plan view of one of the arms from the workpiece support apparatus illustrated in FIG. 1.

FIG. 11 is a side elevation view, in section, of one of the arms from the workpiece support apparatus illustrated in FIG. 1.

DETAILED DESCRIPTION OF THE PREFERRED EMBODIMENT

Figure 1:
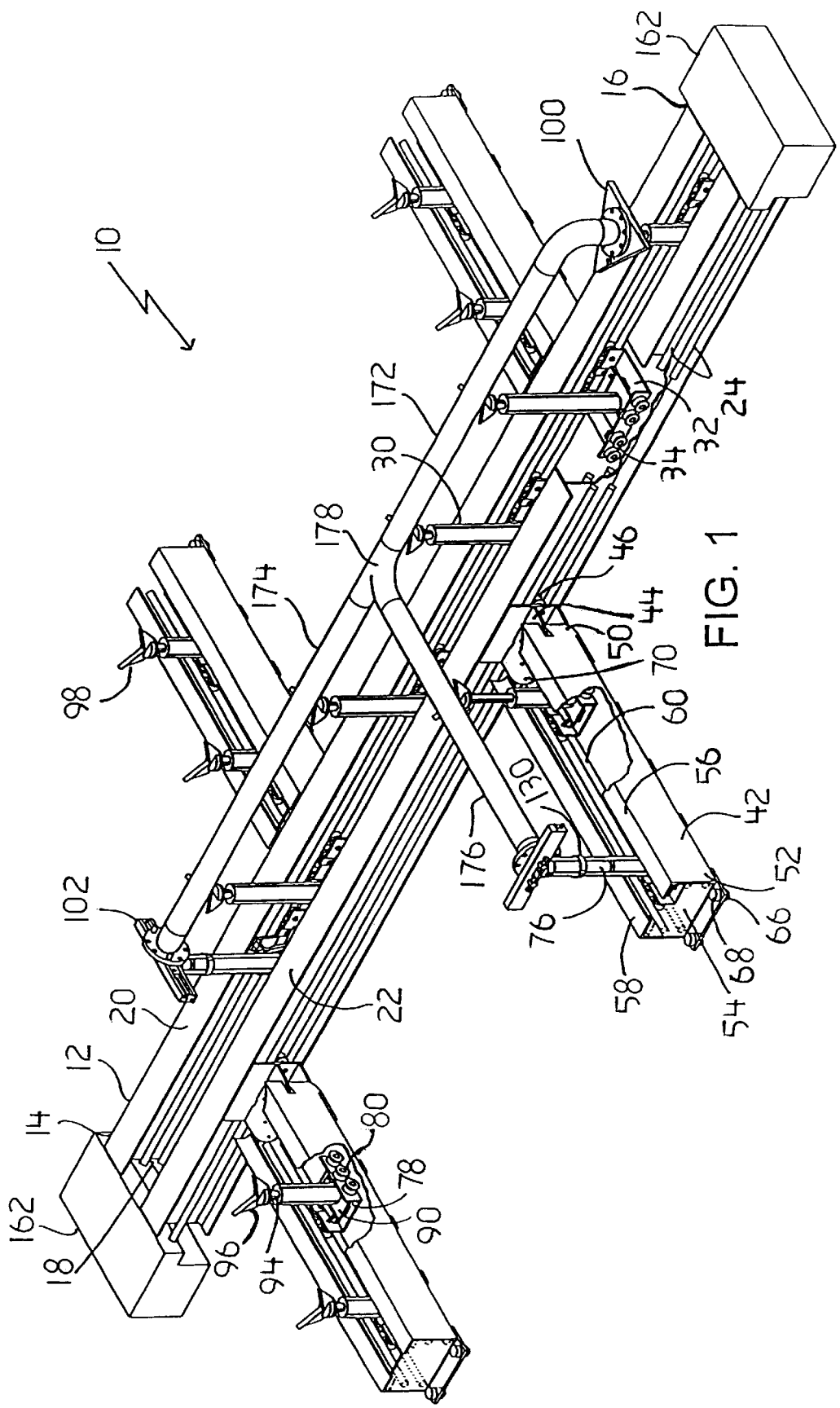
FIG. 1 is a perspective view of a workpiece support apparatus constructed in accordance with the teachings of the present invention.

The preferred embodiment, a workpiece support apparatus generally identified by reference numeral 10, will now be described with reference to FIGS. 1 through 24.

Figure 3:
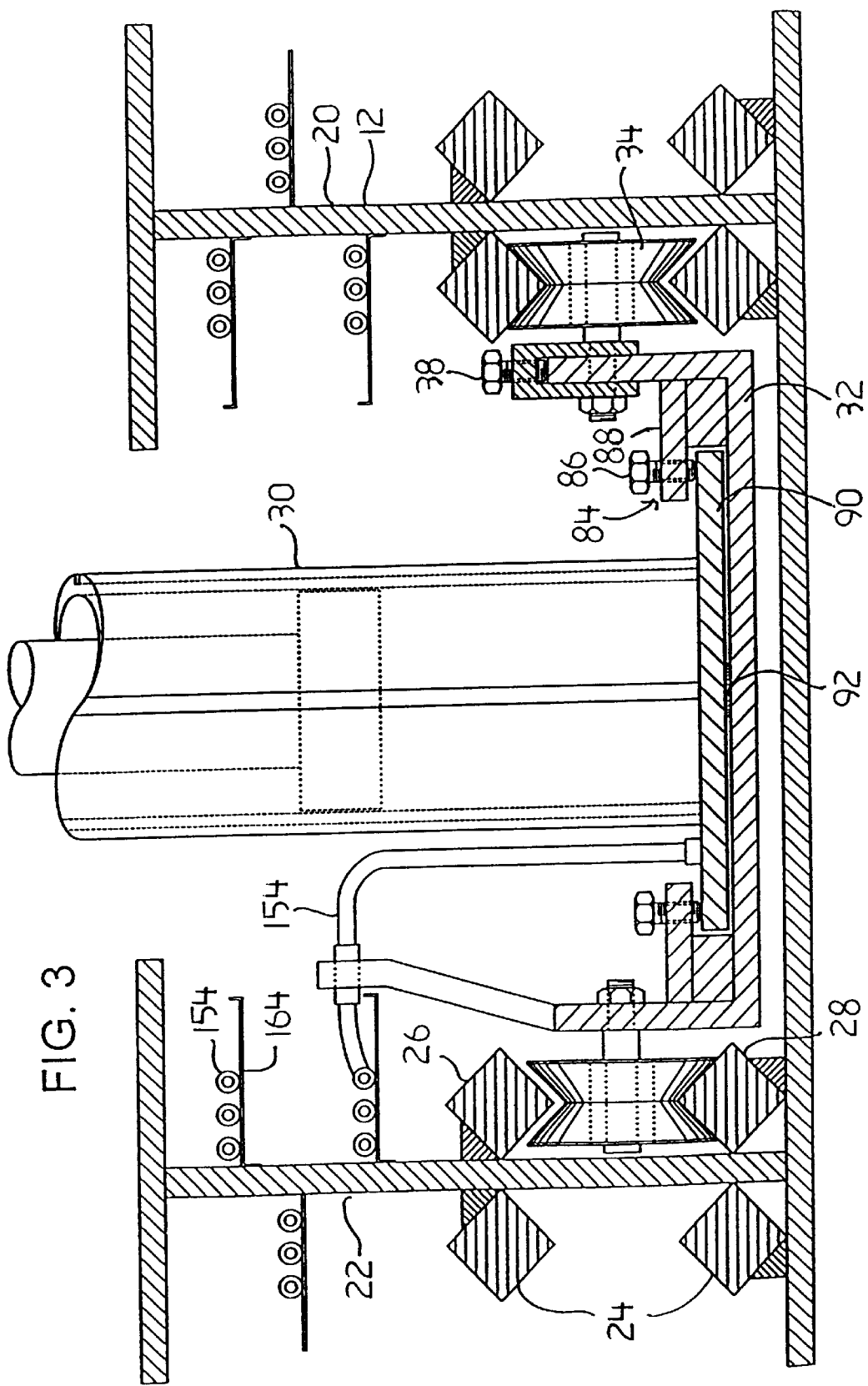
FIG. 3 is an end elevation view, in section, of the workpiece support apparatus illustrated in FIG. 1.

Structure and Relationship of Parts:

Referring to FIG. 1, there is provided a workpiece support apparatus 10 which includes an elongate channel-form primary body 12 having a first end 14, a second end 16, a longitudinal axis 18, a first sidewall 20 and a second sidewall 22. Tracks 24 extend longitudinally along both first sidewall 20 and second sidewall 22 of primary body 12. Referring to FIG. 3, tracks 24 include an upper rail 26 and a lower rail 28.

Figure 4:
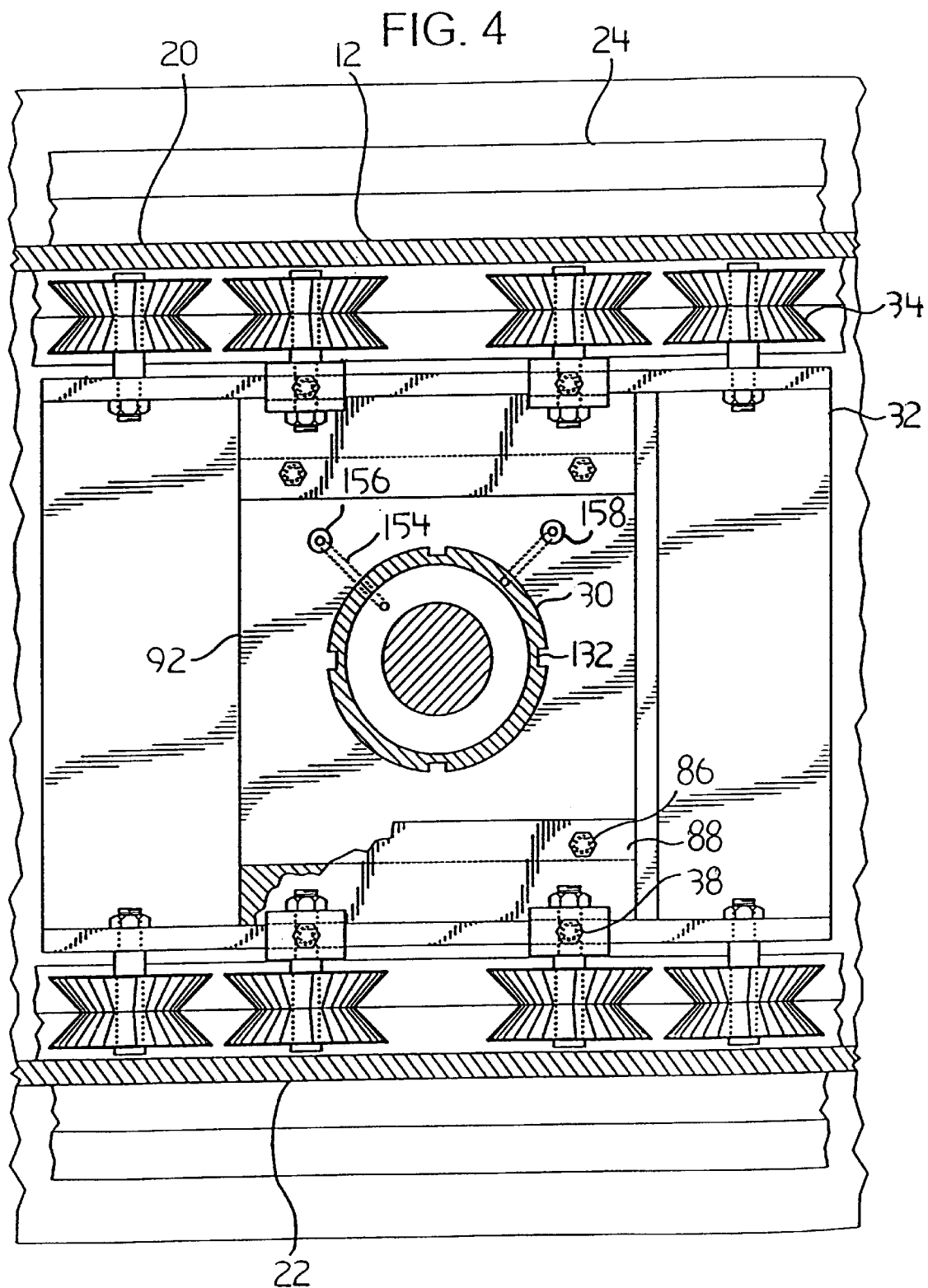
FIG. 4 is a top plan view, in section, of one of the support columns from the workpiece support apparatus illustrated in FIG. 1.

Referring to FIG. 1, several height adjustable primary support columns 30 extend vertically from primary body 12. Referring to FIG. 3, each of primary support columns 30 has a base 32 with adjustable rollers 34 which engage tracks 24 of primary body 12 for axial movement along primary body 12 whereby primary support columns 30 are selectively positioned. Referring to FIGS. 4 and 5, primary support columns 30 are moved by means of adjustable rollers 34 that engage tracks 24 of primary body 12. Referring to FIG. 5, adjustable rollers 34 have bearings 36 which facilitate the rotation of adjustable rollers 34 while engaged to tracks 24. Referring to FIGS. 3 and 6, adjustable rollers 34 are adjustable so that adjustable rollers 34 on one side of base 32 engage with upper rail 26 of corresponding track 24 and so that adjustable rollers 34 on opposing side of base 32 engage with lower rail 28 of corresponding track 24. To adjust adjustable rollers 34, a screw adjustment 38 is provided on base 32 whereby adjustable rollers 34 can be drawn upward to engage upper rail 26 of track 24 by turning screw adjustment 38 in one direction, or released from engagement with track 24 by turning screw adjustment 38 in a counter direction.

Figure 8:
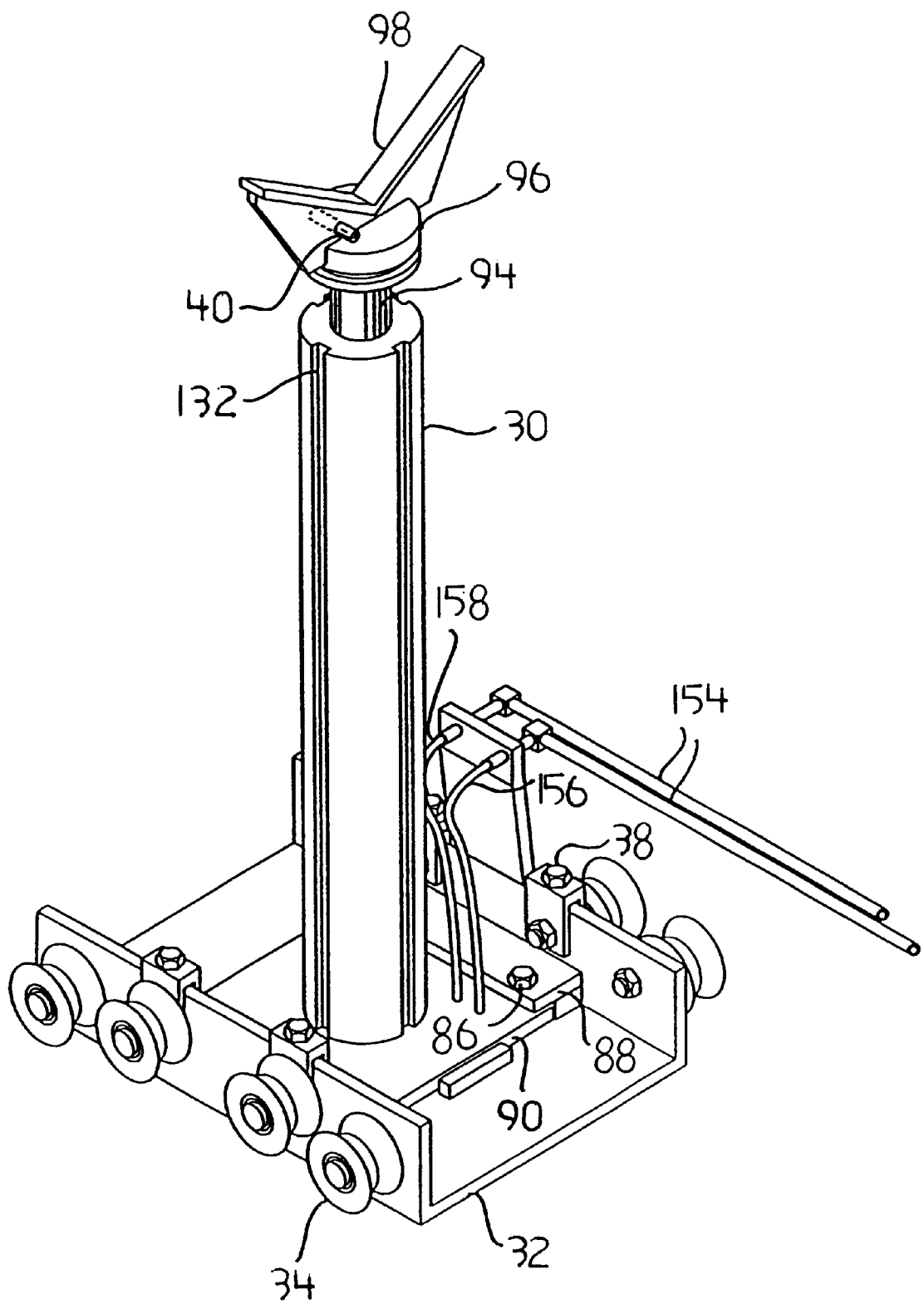
FIG. 8 is a perspective view of one of the support columns from the workpiece support apparatus illustrated in FIG. 1, with a "V" shaped workpiece engaging member.

Referring to FIG. 8, laser alignment targets 40 are provided on each of primary support columns 30 for aligning primary support columns 30 along longitudinal axis 18 of primary body 12 and ensuring that all are positioned along the same horizontal plane.

Figure 9:
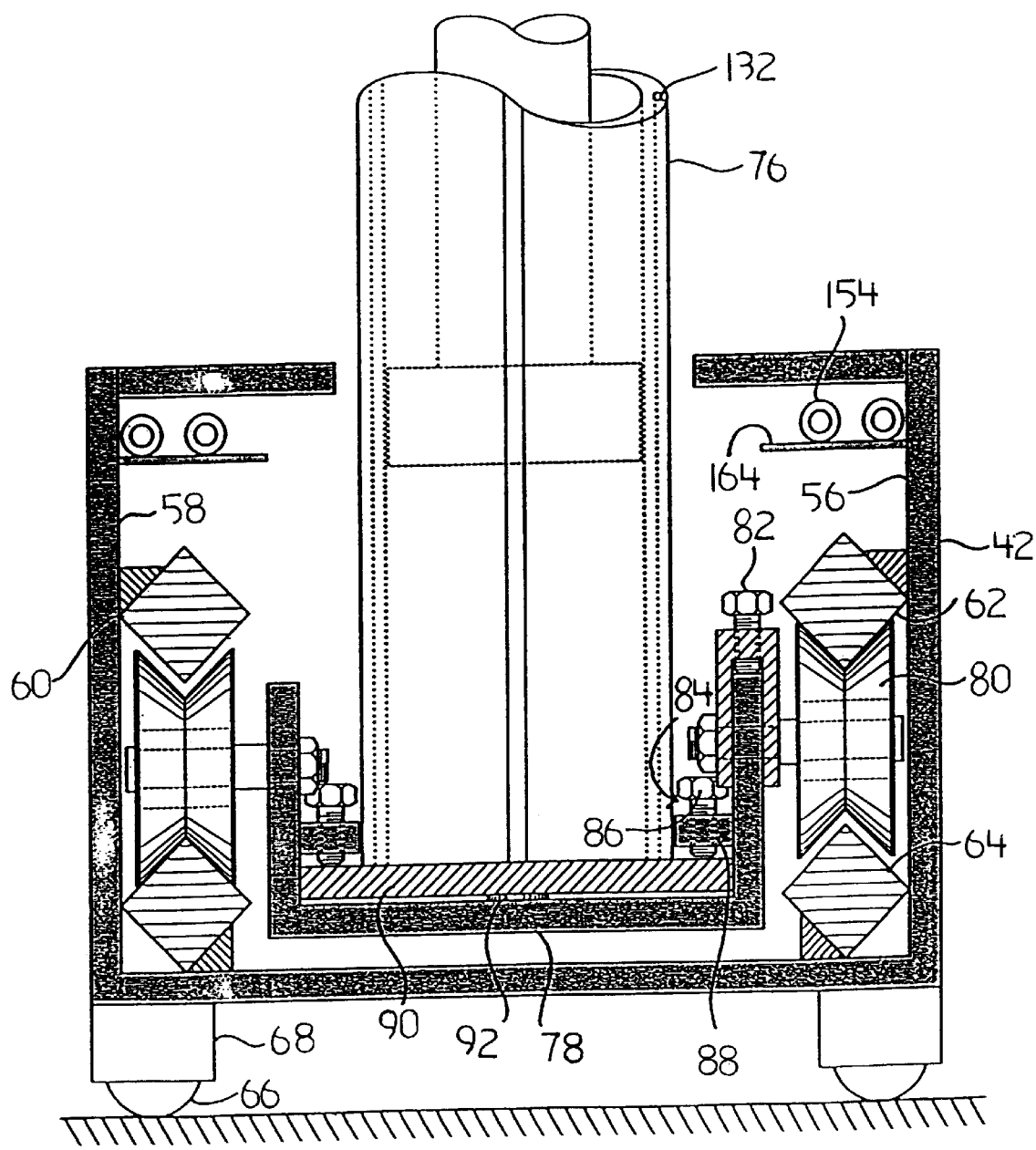
FIG. 9 is an end elevation view, in section, of one of the arms from the workpiece support apparatus illustrated in FIG. 1.

Referring to FIG. 1, elongate channel-form arms 42 extend radially from and are pivotally secured at pivotal connections 44 to first sidewall 20 and second sidewall 22 of primary body 12. Pivotal connections 44 are mounted on rollers 46 which engage with tracks 24 located on exteriors of first sidewall 20 and second sidewall 22 such that arms 42 may be repositioned longitudinally along primary body 12. Referring to FIG. 11, each arm 42 pivots about a substantially vertical axis 48 for angular adjustment on a substantially horizontal plane. Referring to FIG. 10, each arm 42 has a first end 50, a second end 52, a longitudinal axis 54, a first sidewall 56 and a second sidewall 58. Referring to FIG. 11, tracks 60 extend longitudinally along interiors of first sidewall 56 and second sidewall 58 of each of arms 42. Referring to FIG. 9, tracks 60 include an upper rail 62 and a lower rail 64.

Referring to FIGS. 9 and 11, each arm 42 also has underlying rollers 66. Each of underlying rollers 66 are spring mounted within a roller housing 68. Rollers 66 have an extended position extending from housing 68 and a retracted position retracted within housing 68. Rollers 66 are normally in the extended position although rollers 66 will assume the retracted position when a load is applied that overcomes the biasing force of spring mounting.

Referring to FIG. 10, pivotal connections 44 that are located toward first end 50 of each arm 42 have several apertures 70. Referring to FIG. 11, arms 42 are locked into a selected angular position by inserting a locking pin 72 into one of apertures 70. A thumbscrew 74 is provided in the event a selected position does not correspond with an aperture 70.

Height adjustable secondary support columns 76 extend vertically from each arm 42. Referring to FIG. 9, each of secondary support columns 76 has a base 78 with adjustable rollers 80 that engage tracks 60 of arms 42 for axial movement along arms 42 such that secondary support columns 76 can be selectively positioned.

Adjustable rollers 80 are adjusted so that adjustable rollers 80 on one side of base 78 engage with upper rail 62 of corresponding track 60 while adjustable rollers 80 on opposing side of base 78 engage with lower rail 64 of corresponding track 60. To adjust adjustable rollers 80, a screw adjustment 82 is provided on base 78 whereby adjustable rollers 80 can be drawn upward to engage upper rail 62 of track 60 by turning screw adjustment 82 in one direction and released from engagement with track 60 by turning screw adjustment 82 in a counter direction.

Referring to FIG. 3, each of primary support columns 30 has a screw levelling adjustment 84. Screw levelling adjustment 84 includes screws 86 that are inserted through several inwardly protruding screw supports 88 located on opposing sides of base 32. A support plate 90 underlies primary support column 30 and balances on a support post 92 on top of base 32. When screws 86 are turned, screws 86 impinge on balancing support plate 90 causing support plate 90 to tilt in a direction and therefore causing primary support column 32 to tilt in the same direction. Screws 86 can be alternatingly adjusted until the desired levelling of primary support column 30 is obtained. Referring to FIG. 9, each of secondary support columns 76 also has a screw levelling adjustment 84 which adjusts the levelling of secondary support columns 76 in the same manner as primary support columns 30.

Figure 7:
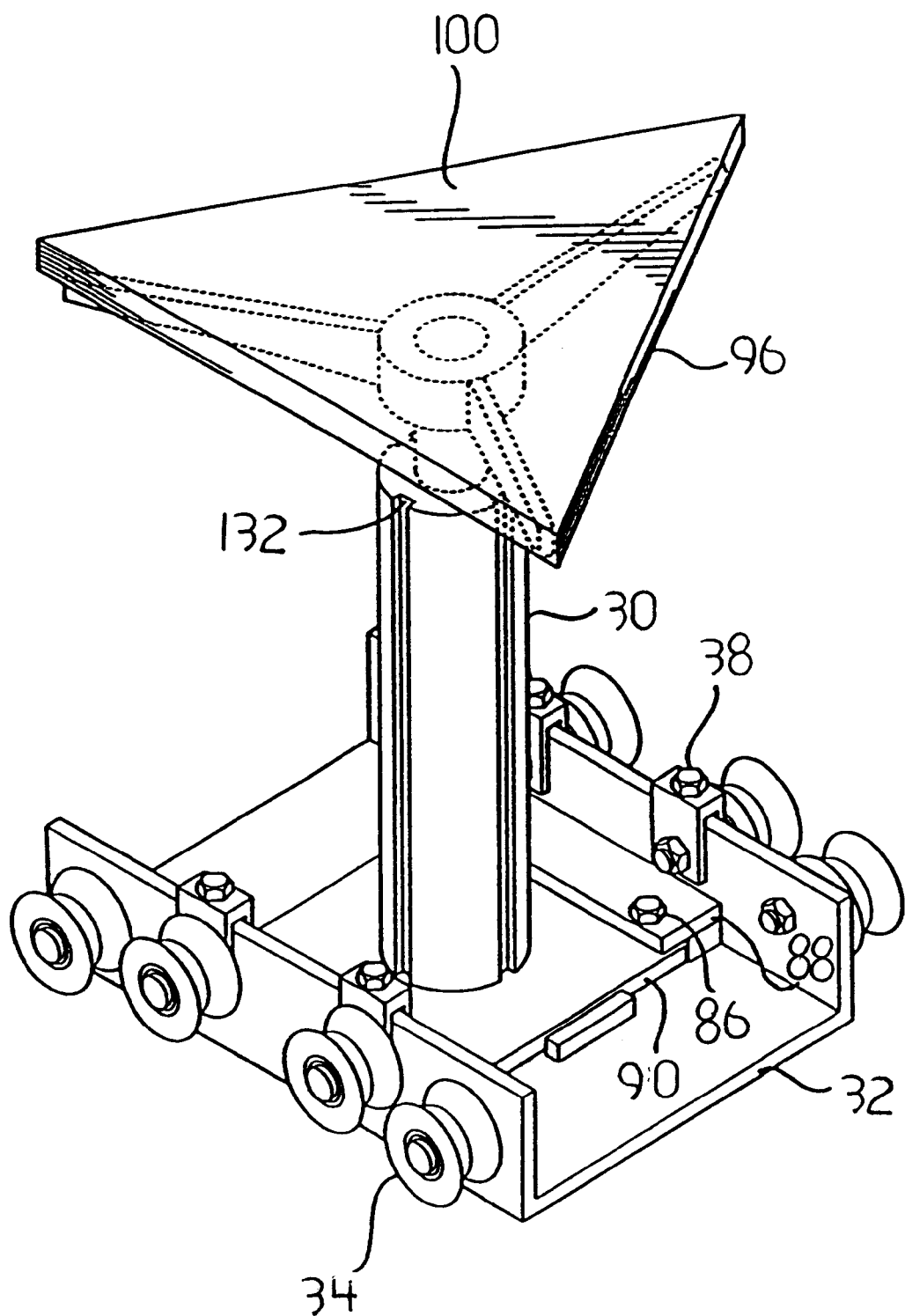
FIG. 7 is a perspective view of one of the support columns from the workpiece support apparatus illustrated in FIG. 1, with a table top workpiece engaging member.

Referring to FIG. 1, each of primary support columns 30 and each of secondary support columns 76 also have a top mounting adaptor 94 that is adapted to receive a workpiece engaging member 96. Several alternative workpiece engaging members 96 with differing support characteristics are provided for top mounting adaptors 94. Alternative workpiece engaging members include a "V" shaped workpiece engaging member 98 as illustrated in FIG. 8, a table style workpiece engaging member 100 as illustrated in FIG. 7, and a mounting bar attachment 102 as illustrated in FIG. 13.

Figure 13:
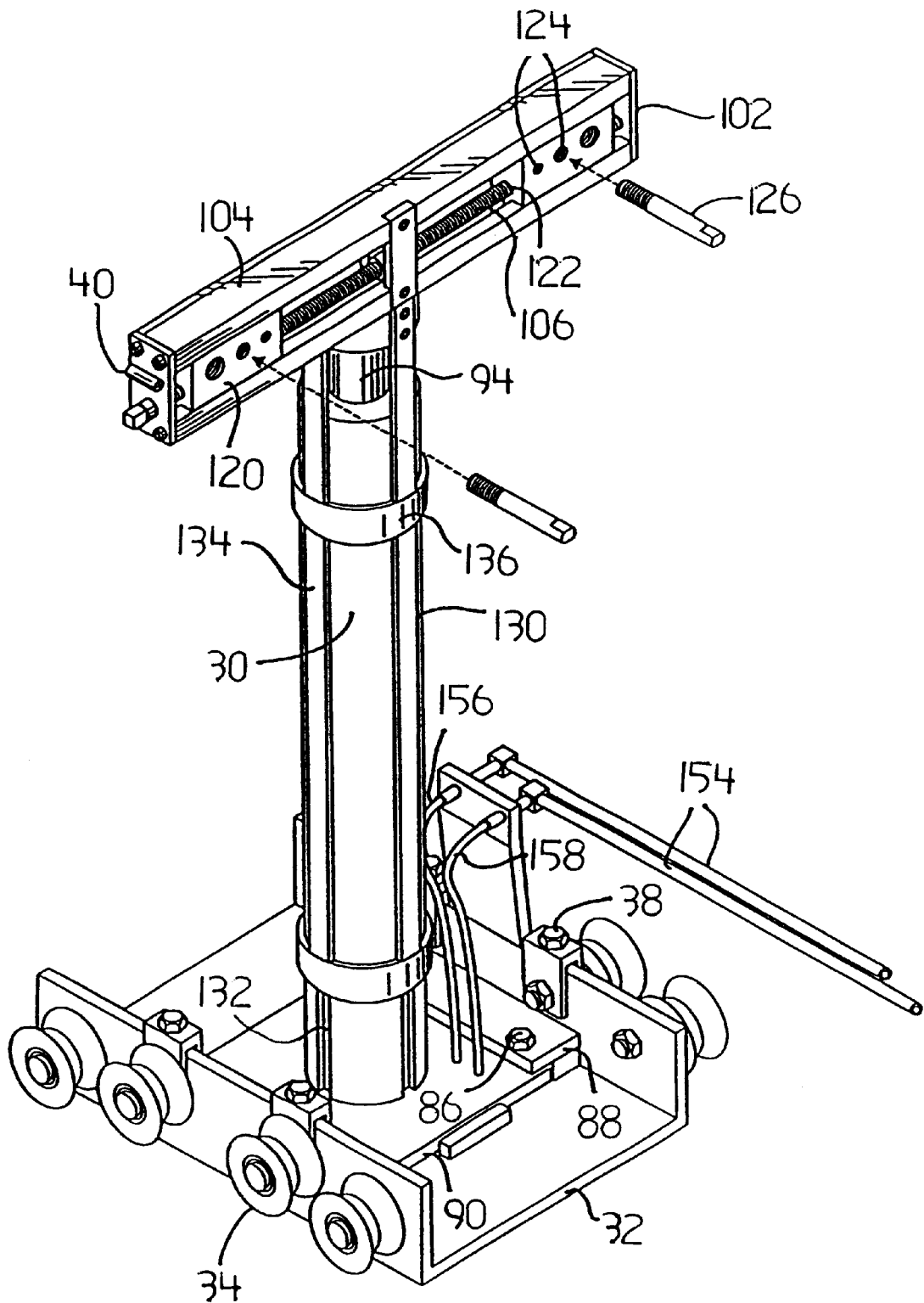
FIG. 13 is a perspective view of one of the support columns from the workpiece support apparatus illustrated in FIG. 1, with a mounting bar workpiece engaging member.
Figure 20:
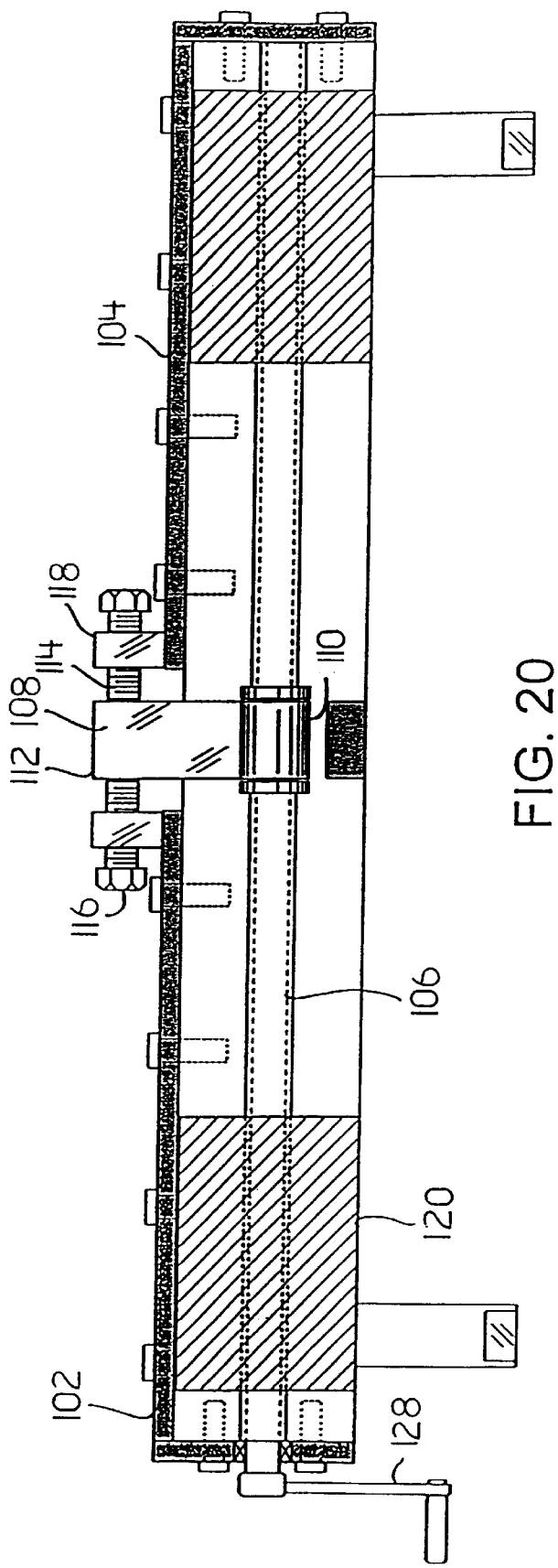
FIG. 20 is a top plan view, in section, of the mounting bar workpiece engaging member from the workpiece support apparatus illustrated in FIG. 1.

Referring to FIG. 13, mounting bar attachment 102 includes a housing 104 with a rotational screw shaft 106 extending longitudinally through interior of housing 102. Referring to FIG. 20, a screw shaft support 108 is provided that extends from interior of housing 102 though to the exterior of housing 102. Screw shaft support 108 has a first end 110 and a second end 112. Rotational screw shaft 106 is threaded through first end 110 of screw shaft support 108 while the threaded body 114 of a screw adjustment 116 is threaded through second end 112 of screw shaft support 108. Threaded body 114 of screw shaft adjustment 116 is also threaded through mounts 118 positioned on exterior of housing 104.

Figure 18:
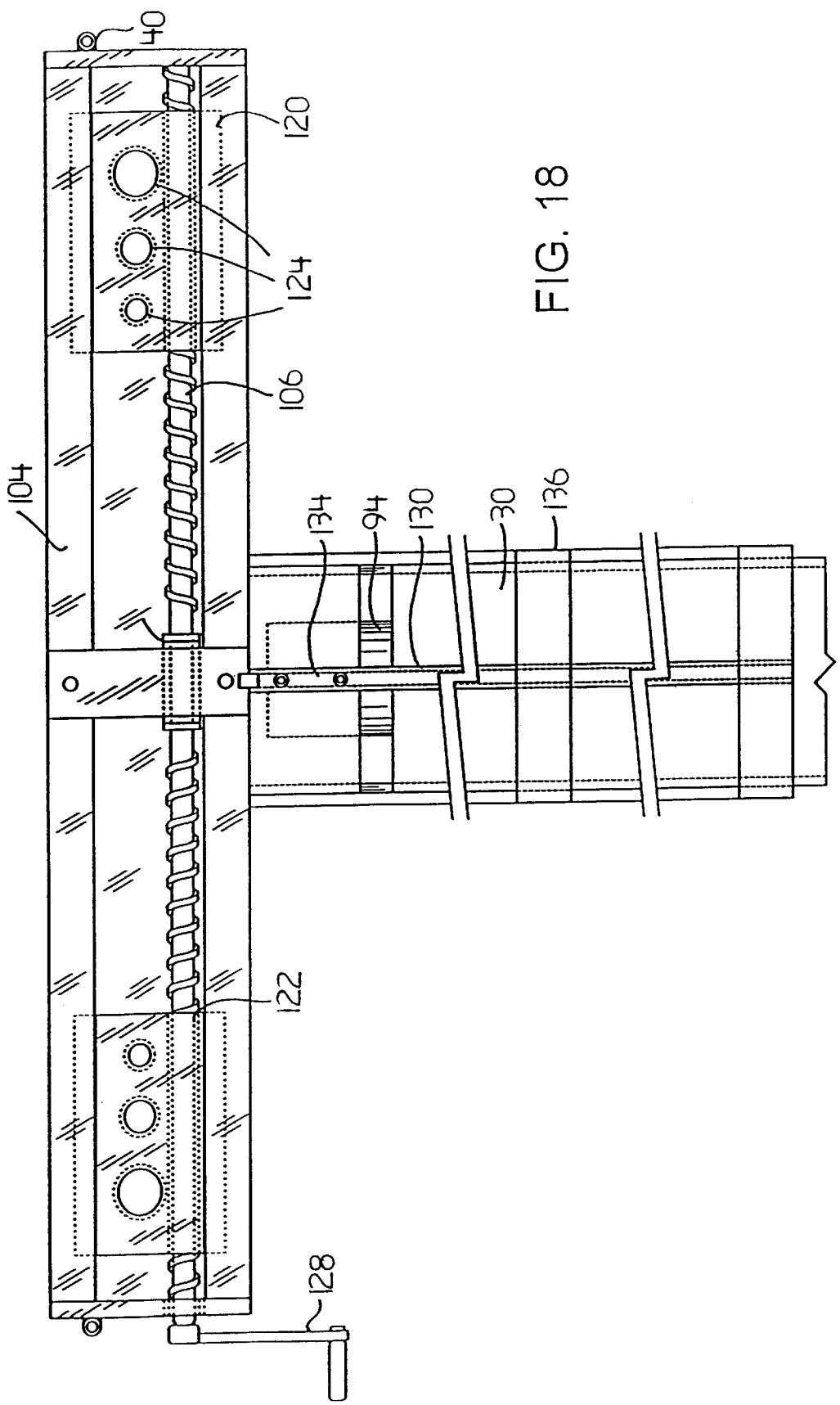
FIG. 18 is a front elevation view of the mounting bar workpiece engaging member from the workpiece support apparatus illustrated in FIG. 13.

Referring to FIG. 18, two movable blocks 120 are mounted on either end of rotational screw shaft 106 such that rotational screw shaft 106 is threaded through a threaded channel 122 in each block 120. Blocks 120 have several pin holes 124 adapted to receive projecting pins 126. Pin holes 126 may be of varying sizes. Blocks 120 can be moved by manually rotating a shaft handle 128 of rotation screw shaft 106 which in turn causes rotational screw shaft 106 to turn. As rotational screw shaft 106 rotates in one direction, blocks 120 move toward each other. Rotation of rotational screw shaft 106 in the other direction causes blocks 120 to move apart from each other. In this manner the spacing between the blocks 120 can be roughly adjusted. Referring to FIG. 20, if further fine adjustment is required, screw adjustment 116 on exterior of housing 104 can be used for fine adjustment of the positioning of blocks 120. By rotating screw adjustment 116, shaft support 108 can be moved subtly along threaded body 114 of screw adjustment 116. Because rotational screw shaft 106 is threadably mounted through shaft support 108, rotational screw shaft 106 also moves subtly to adjust the positioning of block 120.

Referring to FIG. 13, a rigidifying frame 130 is also provided for additional lateral support for workpiece engaging members 96. Referring to FIG. 8, each of primary support columns 30 and secondary support columns 76 have longitudinally extending grooves 132. Referring to FIG. 13, grooves 132 are adapted to receive bars 134 of rigidifying frame 130 to provide lateral stability to workpiece engaging member 96 when mounted on top mounting adaptor 94. Rigidify frame 130 also has bands 136 which encircle and are affixed to bars 134. The purpose of rigidifying frame 130 is to reduce twisting and ensure that workpiece engaging members 96 are always in an orientation that is perpendicular to the workpiece.

Figure 21:
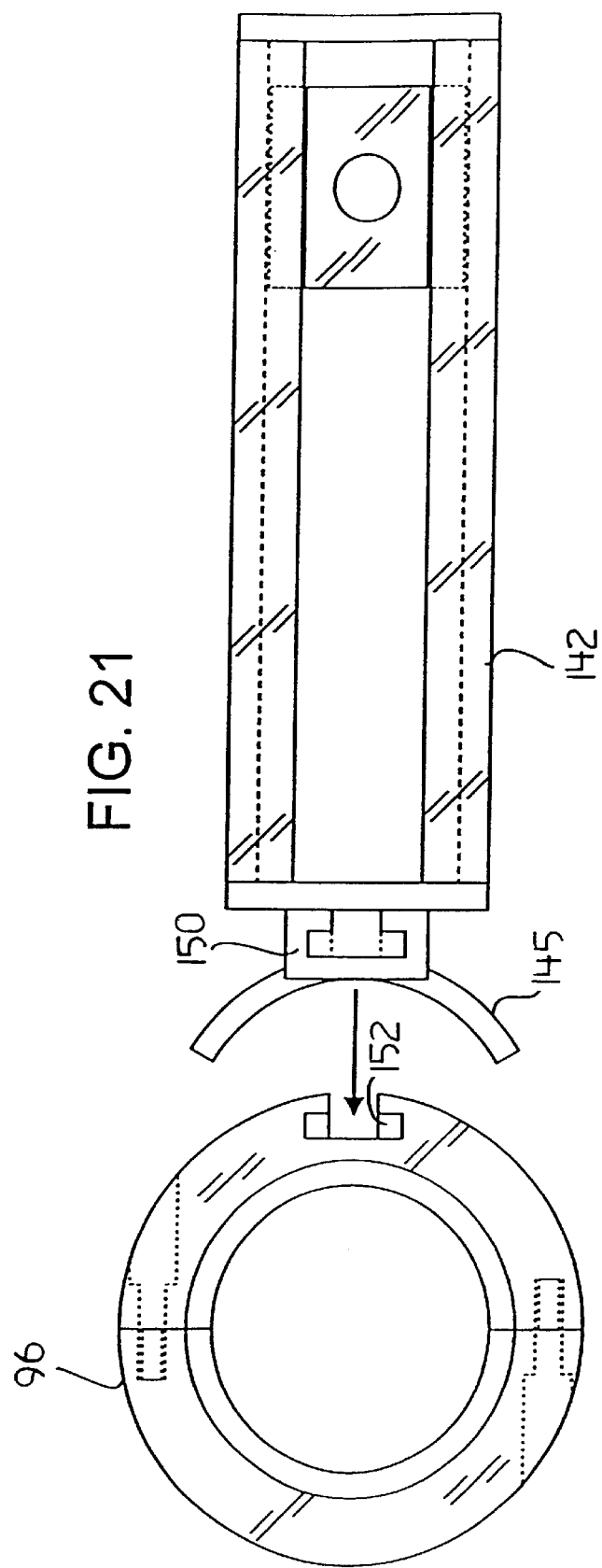
FIG. 21 is a top plan view of the support column with extension support from the workpiece support apparatus illustrated in FIG. 13.
Figure 22:
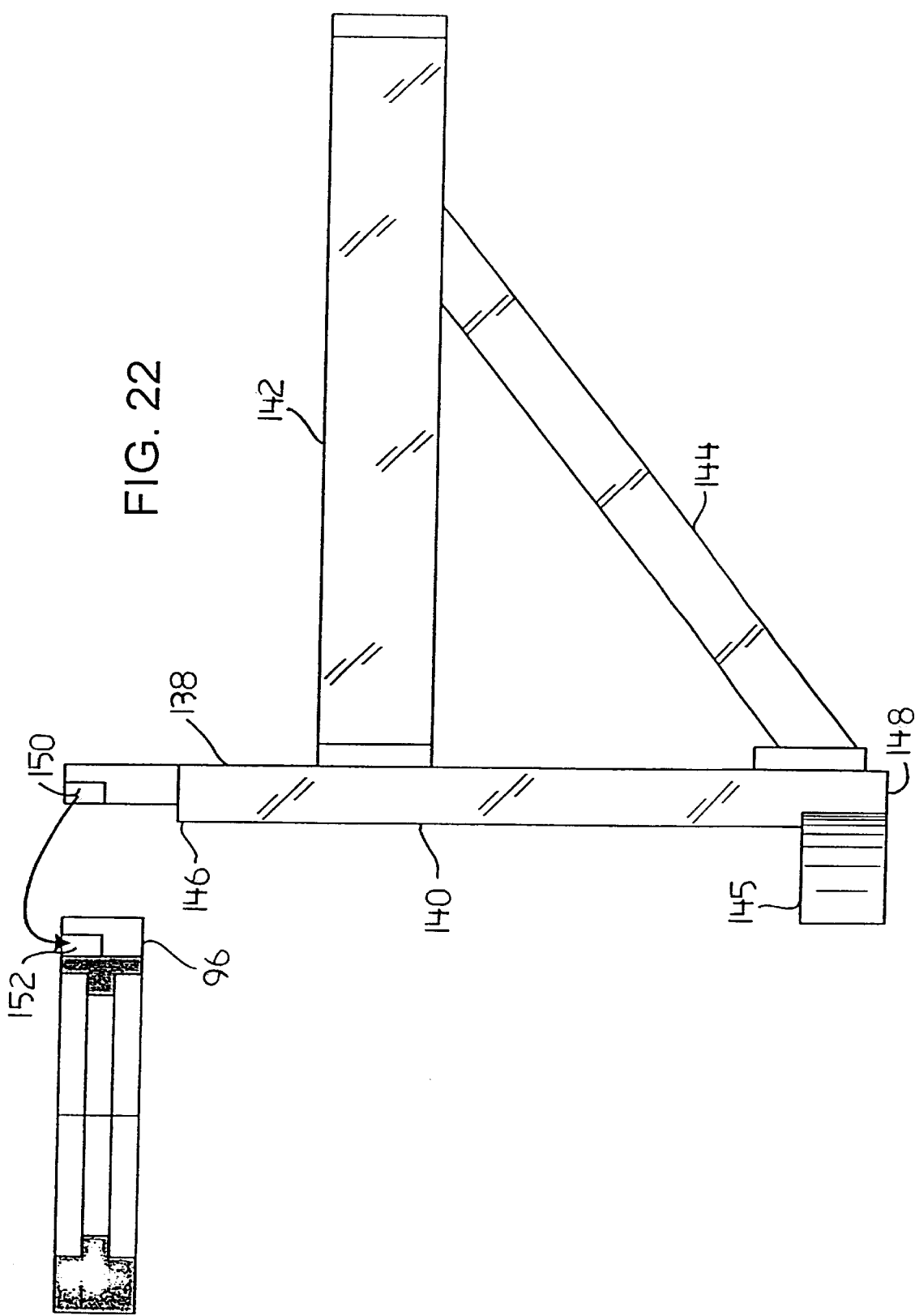
FIG. 22 is a side elevation view of the extension support illustrated in FIG. 21.

Referring to FIG. 22, support extensions 138 are provided for additional support. Support extension 138 has a vertical portion 140, a horizontal portion 142 and a brace 144. Vertical portion 140 has a first end 146 and a second end 148. Brace 144 extends upward at a 45 degree angle from second end 148 of vertical portion 140 to support horizontal portion 142. An arcuate engagement member 145 that is adapted to fit against a primary support column 30 or a secondary support column 76 is provided at second end 148 of vertical portion 140. A "T" shaped male coupling 150 is provided at first end 146 of vertical portion 140. Referring to FIG. 21, male coupling 150 is adapted to mate with "T" shaped female coupling 152 located on workpiece engaging member 96. In the illustrated embodiment, male coupling 150 is a male coupling that slides and locks into female coupling 152, however it will be appreciated that another type of coupling could be used.

Figure 24:
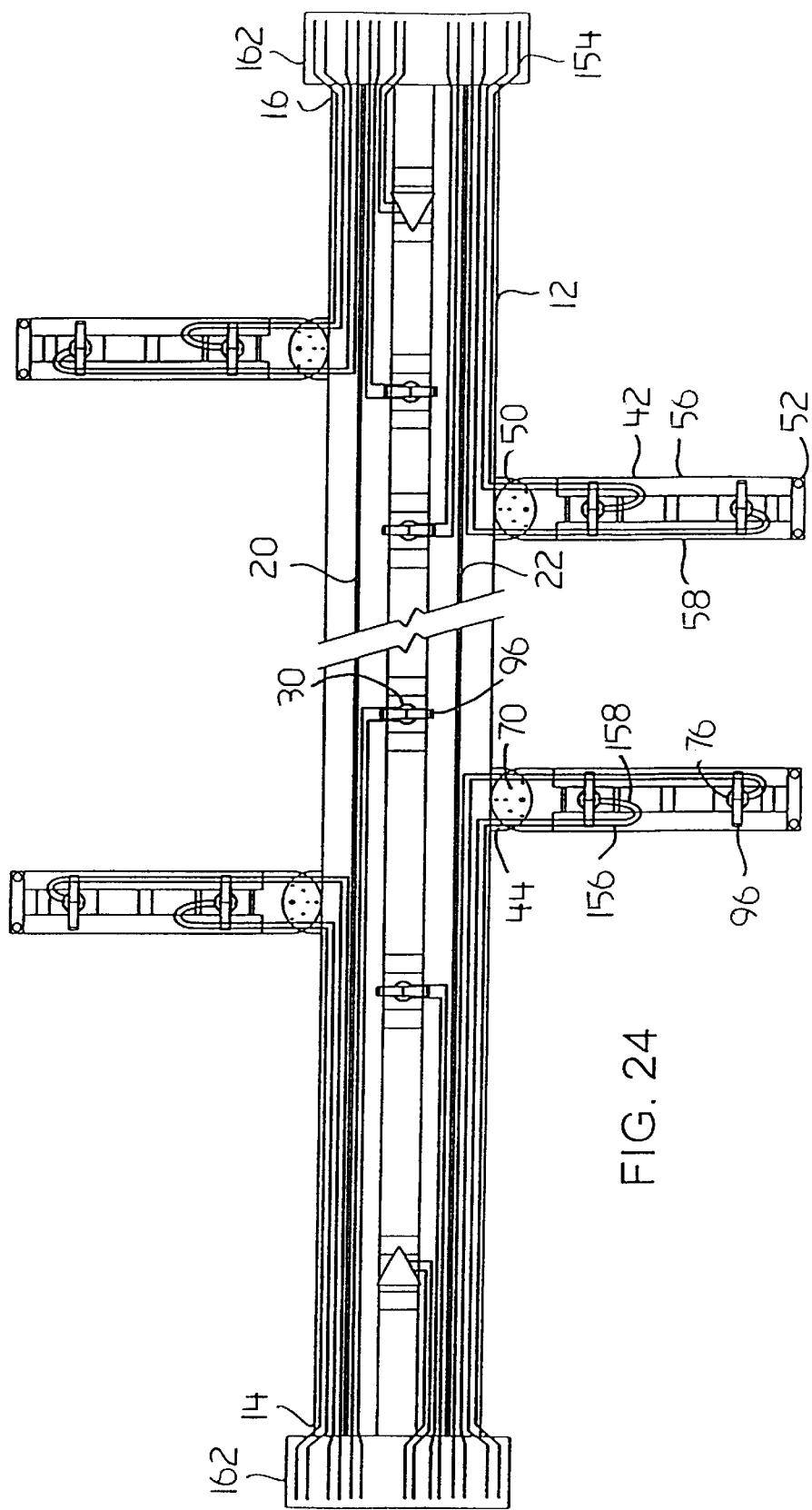
FIG. 24 is a top pan view, in section, of fluid lines leading to the rotary fluid manifolds of the workpiece support apparatus illustrated in FIG. 1.

Referring to FIG. 3, each of primary support columns 30 are fluid activated telescopically extendible cylinders supplied with fluid through fluid lines 154. Referring to FIGS. 8 and 24, each of primary support columns 30 has two fluid lines 154, an inflow line 156 and an outflow line 158. Referring to FIG. 9, each of secondary support columns 76 also are fluid activated telescopically extendible cylinders supplied with fluid though fluid lines 154. Referring to FIG.

Figure 14:
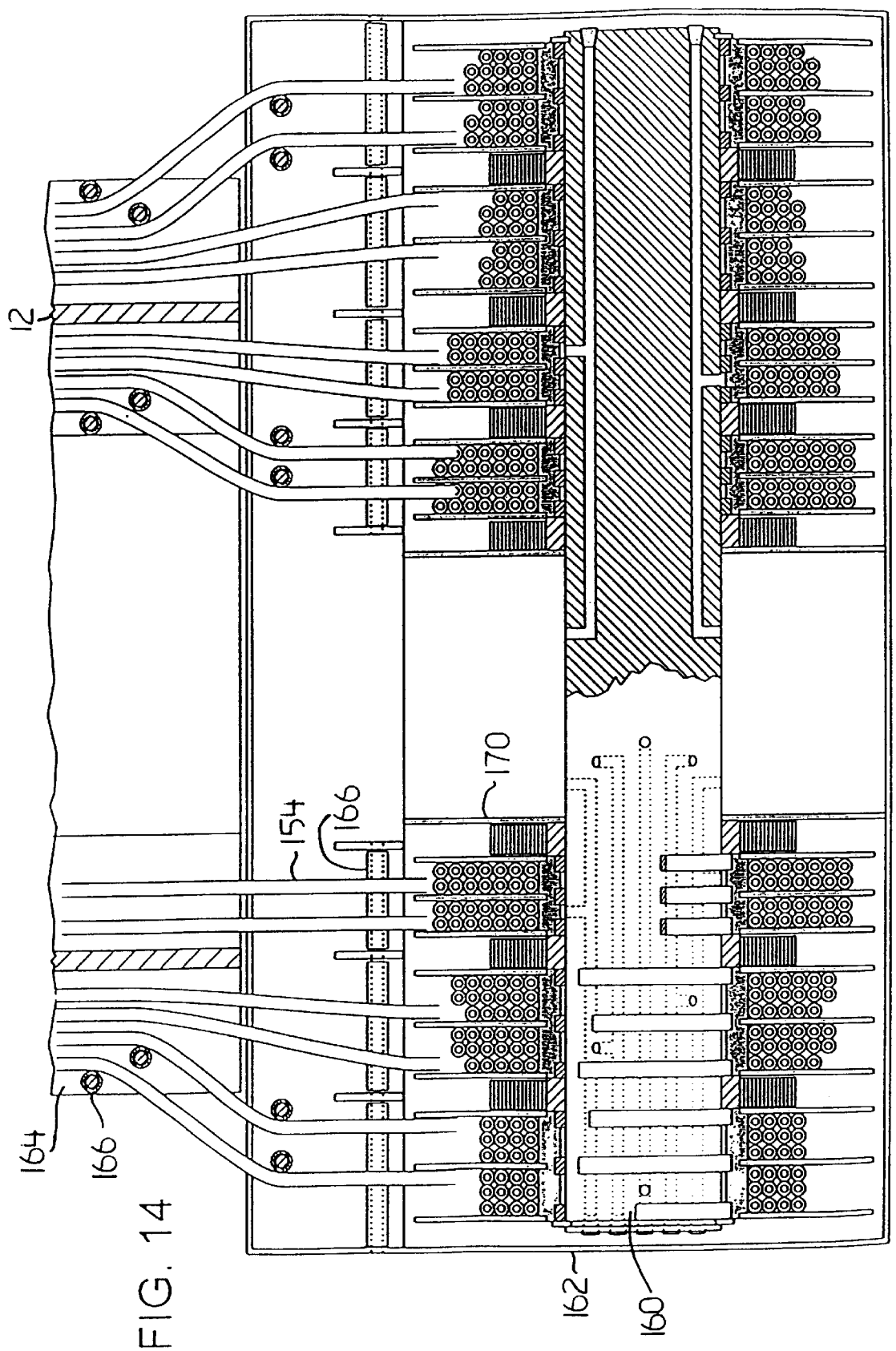
FIG. 14 is a top plan view, in section, of a rotary fluid manifold from the workpiece support apparatus illustrated in FIG. 1.
Figure 15:
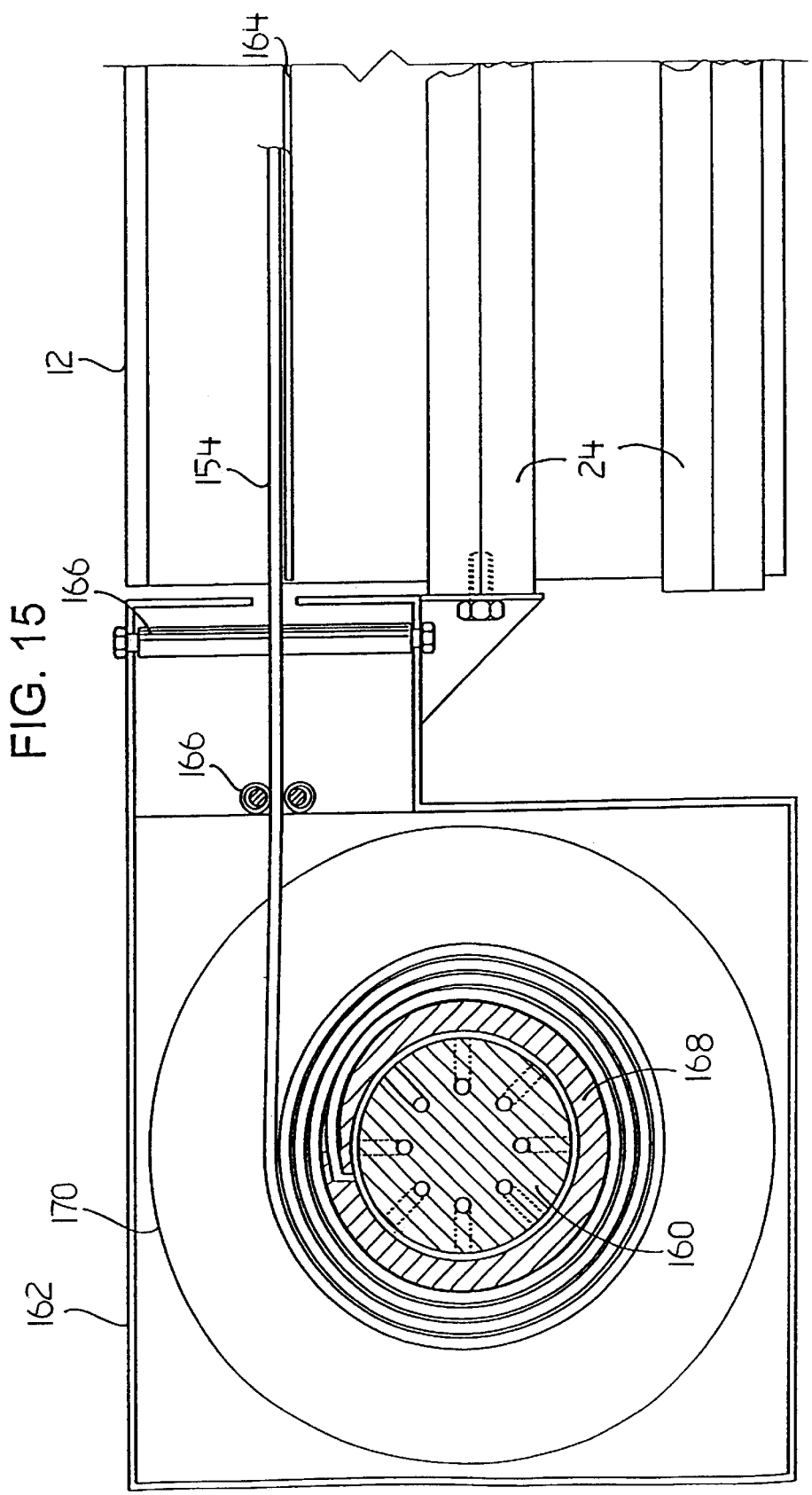
FIG. 15 is a first end elevation view, in section, of the rotary fluid manifold from the workpiece support apparatus illustrated in FIG. 1.
Figure 16:
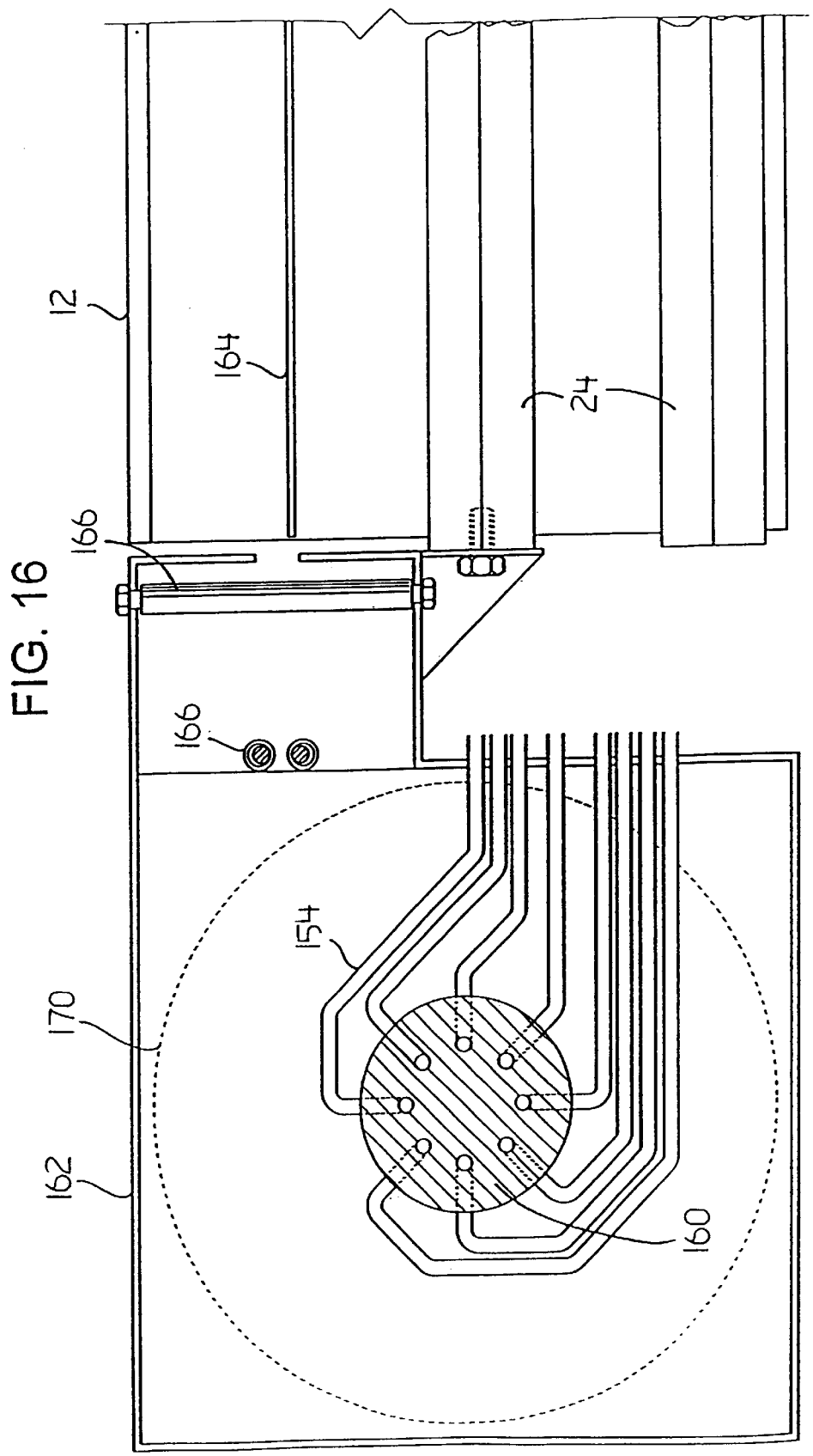
FIG. 16 is a second end elevation view, in section, of the rotary fluid manifold from the workpiece support apparatus illustrated in FIG. 1, showing fluid line connections.
Figure 17:
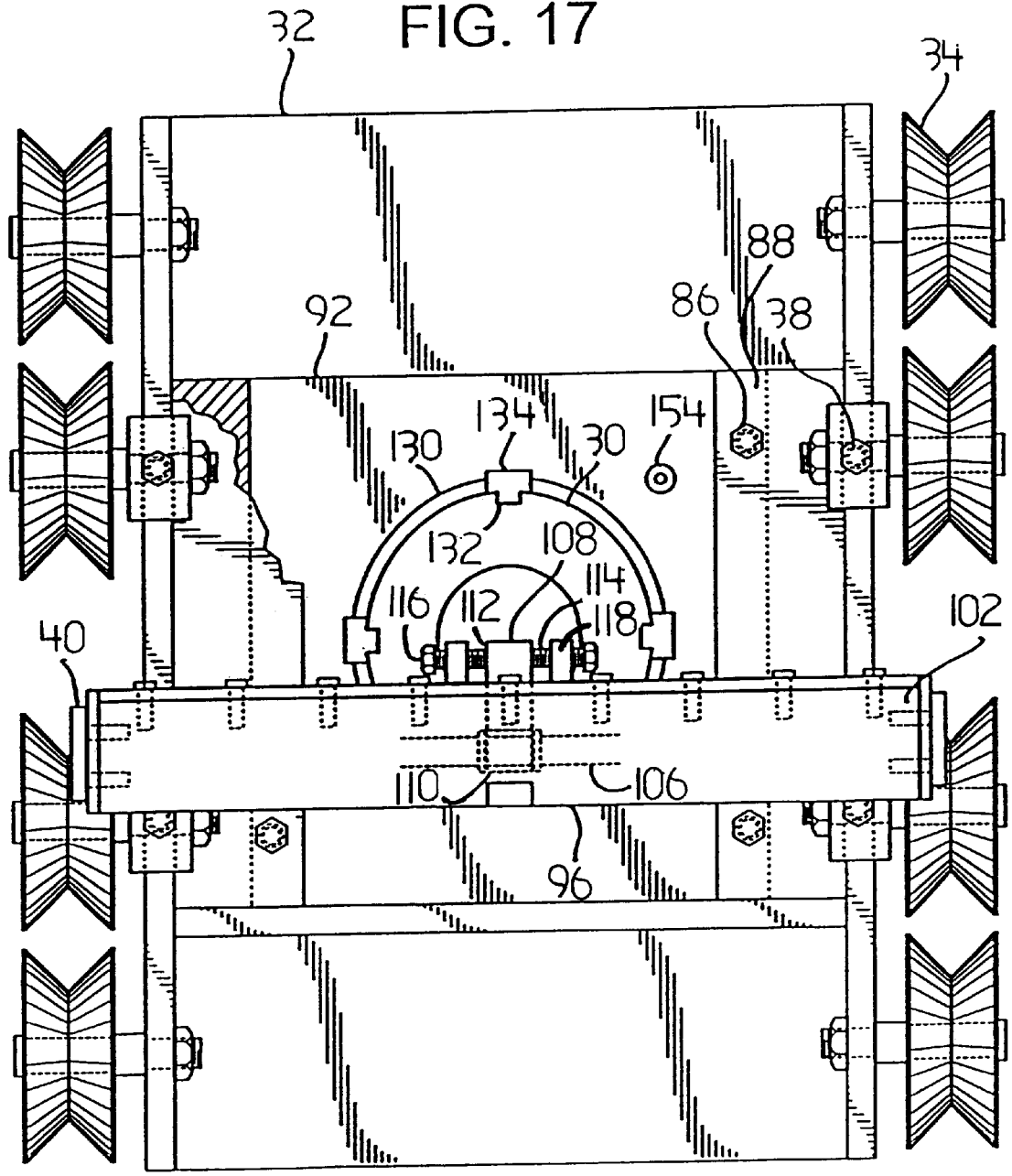
FIG. 17 is a top plan view of the mounting bar workpiece engaging member from the workpiece support apparatus illustrated in FIG. 13.

24, each of secondary support columns 76 also has inflow line 156 and outflow line 158. Fluid lines 154 extend from each of primary support columns 30 and secondary support columns 76 to rotary fluid manifolds 160 positioned inside of rotary manifold housings 162 located at either end of primary body 12. Fluid lines 154 change in length as the positioning of the first primary support column 30 and secondary support columns 76 changes. Referring to FIGS. 3, 9 and 15, fluid lines 154 are supported on shelves 164 that are provided along interiors of first sidewall 20 and second sidewall 22 of primary body 12 and first sidewall 56 and second sidewall 58 of arms 42. Referring to FIG. 14, in order to avoid having fluid lines 154 pinched or damaged a plurality of direction altering rollers 166 are used to route fluid lines 154 along primary body 12. Referring FIG. 15, upon rotation of rotary fluid manifold 160 in a first direction fluid lines 154 are wound onto rotary fluid manifold 160. Referring to FIG. 16, upon rotation of rotary fluid manifold 160 in a second direction fluid lines 154 are fed from rotary fluid manifold 160. Referring to FIG. 15, rotation of rotary fluid manifold 160 is controlled by a spring loaded recoiler 168 which ensures that slack does not develop in fluid lines 154 which could result in fluid lines becoming pinched or damaged. Referring to FIG. 14, fluid lines 154 are segregated by means of a radially extending dividers 170 positioned on rotary fluid manifold 78 to prevent fluid lines 154 from becoming entangled.

Figure 23:
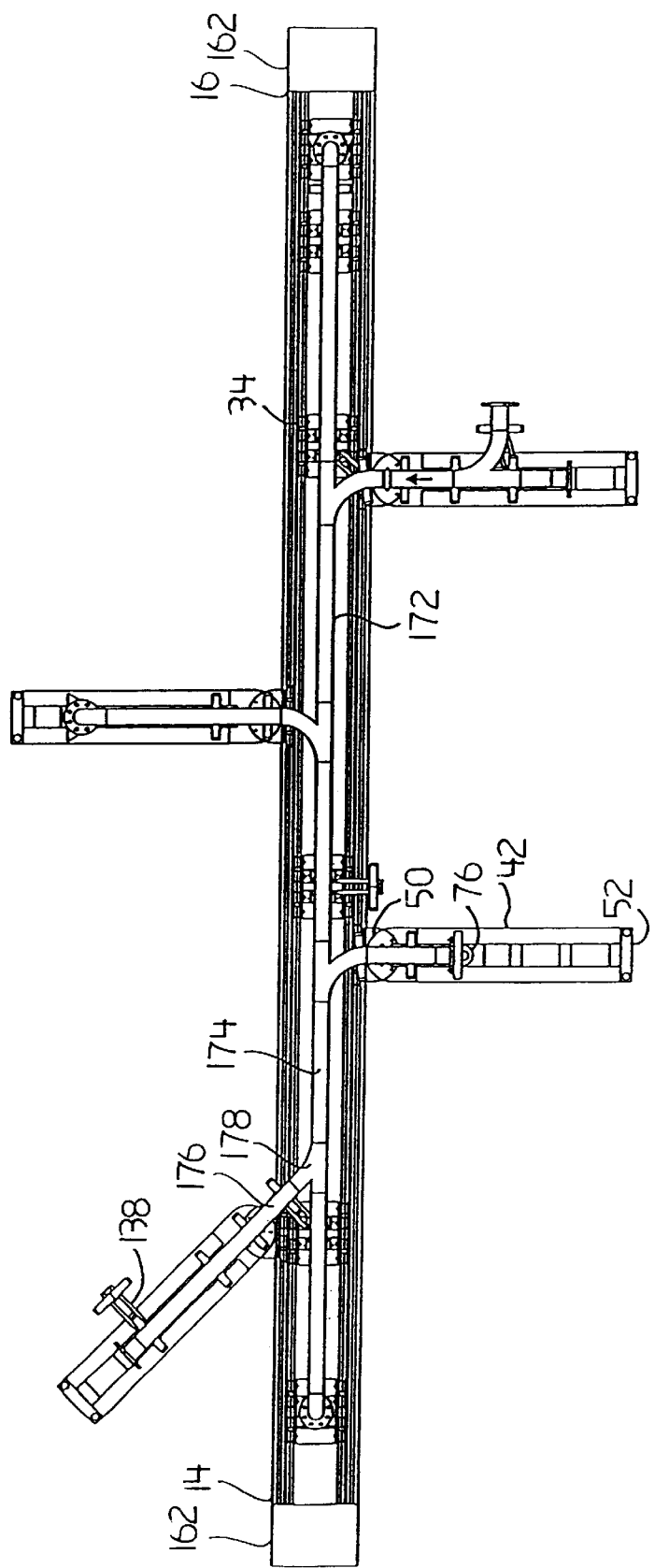
FIG. 23 is a top plan view of the workpiece support apparatus illustrated in FIG. 1, configured to accommodate a complex workpiece.

Operation:

The use and operation of workpiece support apparatus 10 will now be described with reference to FIGS. 1 through 24. Referring to FIGS. 1 and 23, workpiece support apparatus 10, as described above, is used to support a workpiece 172. Workpiece 172 includes a pipe that intended to serve as a primary or trunk line 174 and a pipe which is intended to serves a secondary or branch line 176.

Figure 12:
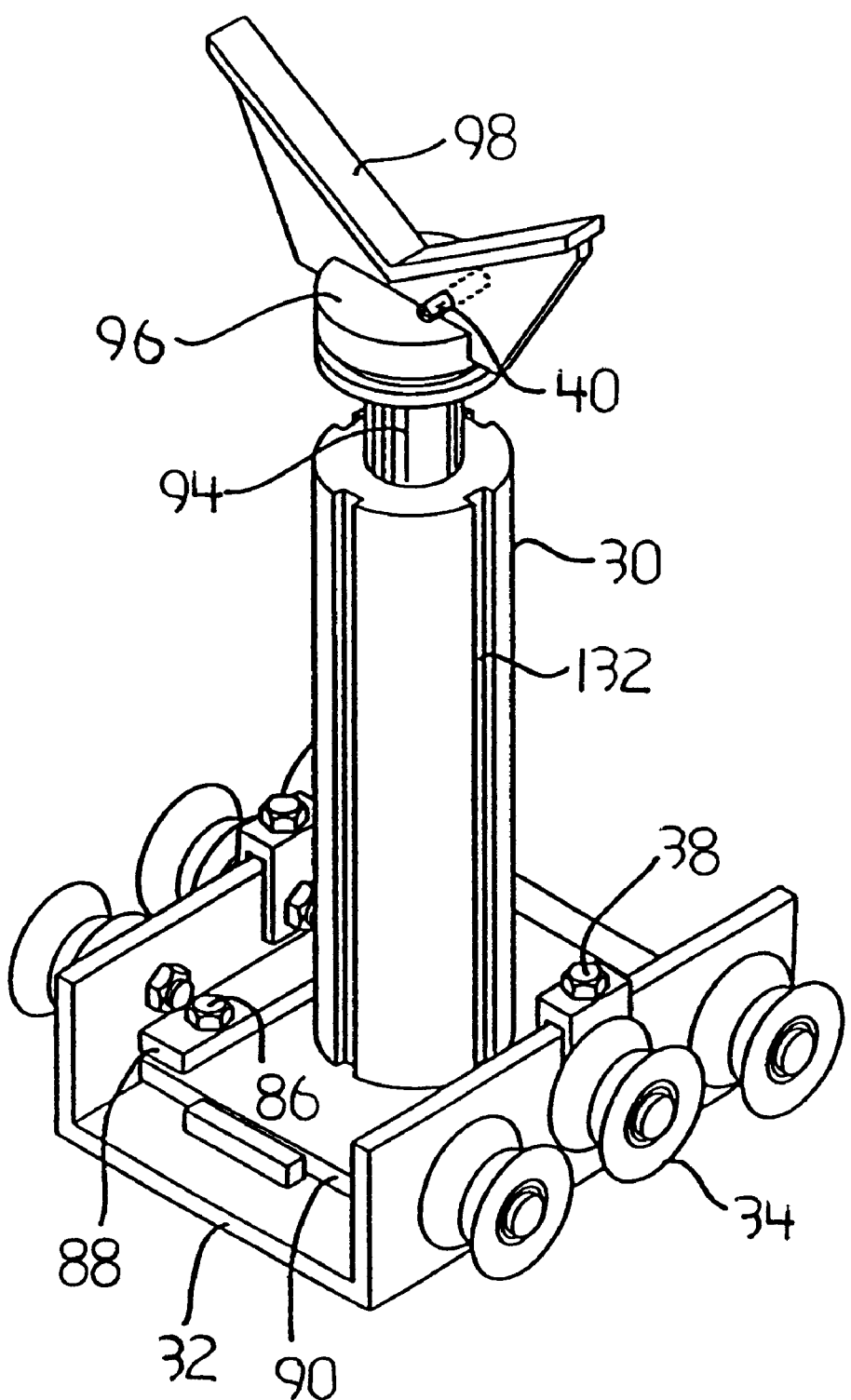
FIG. 12 is a perspective view of one of the secondary support columns the workpiece support apparatus illustrated in FIG. 1.

In preparing workpiece support apparatus 10 to support a workpiece 172, primary support columns 30 are required to be selectively positioned along longitudinal axis 18 of primary body 12 so as to assume the best supporting position for trunk line 174 of workpiece 172. Referring to FIGS. 8 and 12, after positioning, primary support columns 30 need to be aligned so that they are straight and level along a horizontal plane. This is of importance, for workpiece 172 will not be straight and level unless each of primary support columns 30 is straight and level. To facilitate accurate alignment, laser alignment targets 40 are used in conjunction with a laser pen to ensure that primary support columns 30 axially aligned along primary body 12. It will be appreciated that other forms of alignment may also be used instead of laser alignment.

Referring to FIG. 1, next the appropriate number of arms 42 required to support branch lines 176 are selected and are pivotally secured to primary body 12. As the complexity of workpiece 172 is increased, additional arms 42 can be added to accommodate further branch lines 176. Referring to FIG. 1, arms 42 are moved along primary body 12 until arms are positioned at the appropriate spacings to accommodate branch lines 170.

Figure 2:
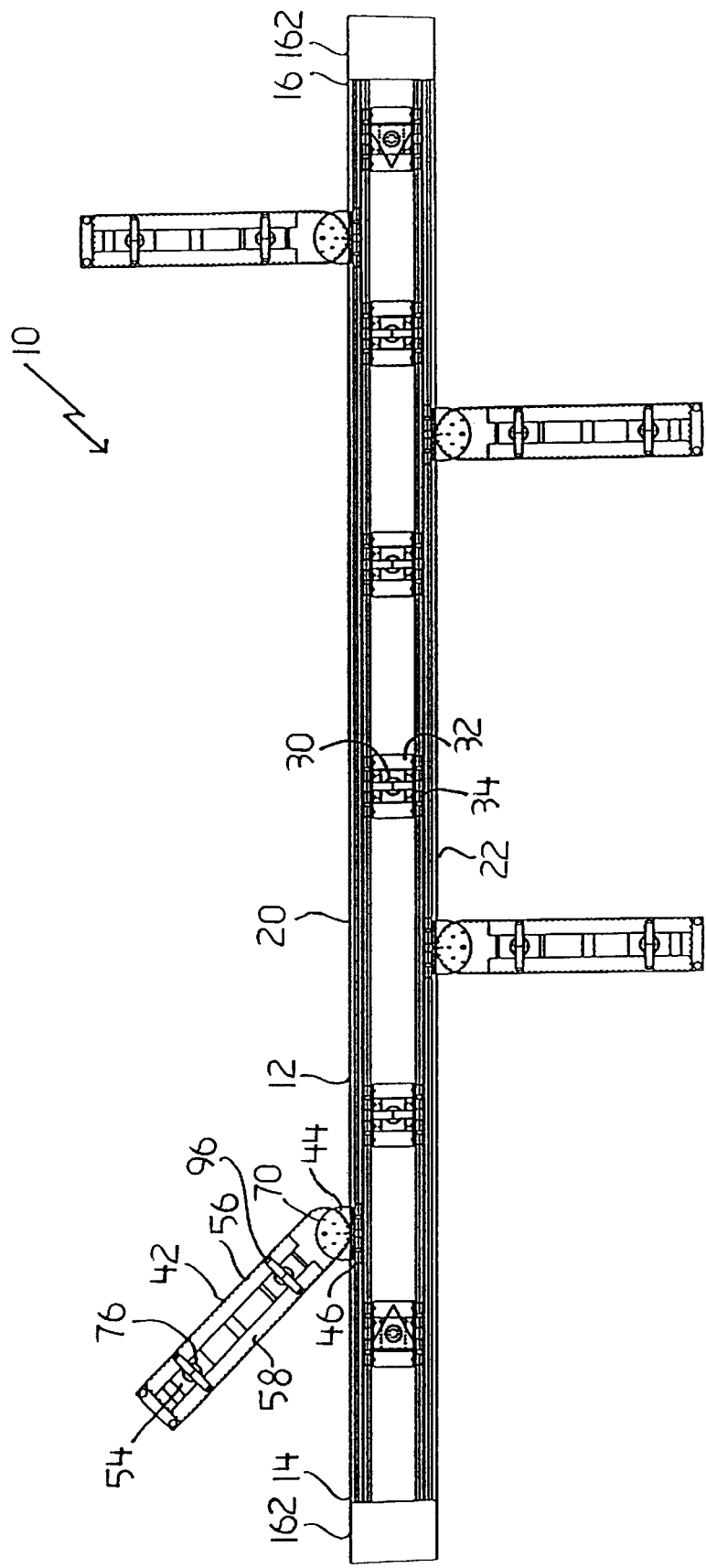
FIG. 2 is a top plan view of the workpiece support apparatus illustrated in FIG. 1.

Referring to FIG. 2, after arms 42 are positioned along primary body 12, then each arm 42 must be adjusted to the correct angle of the proposed intersection 178 between trunk line 174 and each branch line 176.

Referring FIG. 11, once the correct angle for each arm, 42 is found, arm 42 is locked into the preselected position by inserting locking pin 72 into one of apertures 70 on pivotal connection 44. The positions at which support is required will vary to some degree with the configuration of workpiece 172. In the event that arm 42 is positioned at an angle where no apertures 70 are available to receive locking pin 72, thumbscrew 74 may be used. To use thumbscrew 74, thumbscrew 74 is turned in a first direction so that thumbscrew 57 impinges on underlying arm 42 securing arm 42 in position. Turning thumbscrew 42 in the counter direction releases arm 42 allowing arm 42 to be pivoted to an alternative position. Once arms 42 have been secured at the appropriate angle, secondary support columns 76 are then moved to appropriate positions along longitudinal axis 54 of arms 42.

Figure 19:
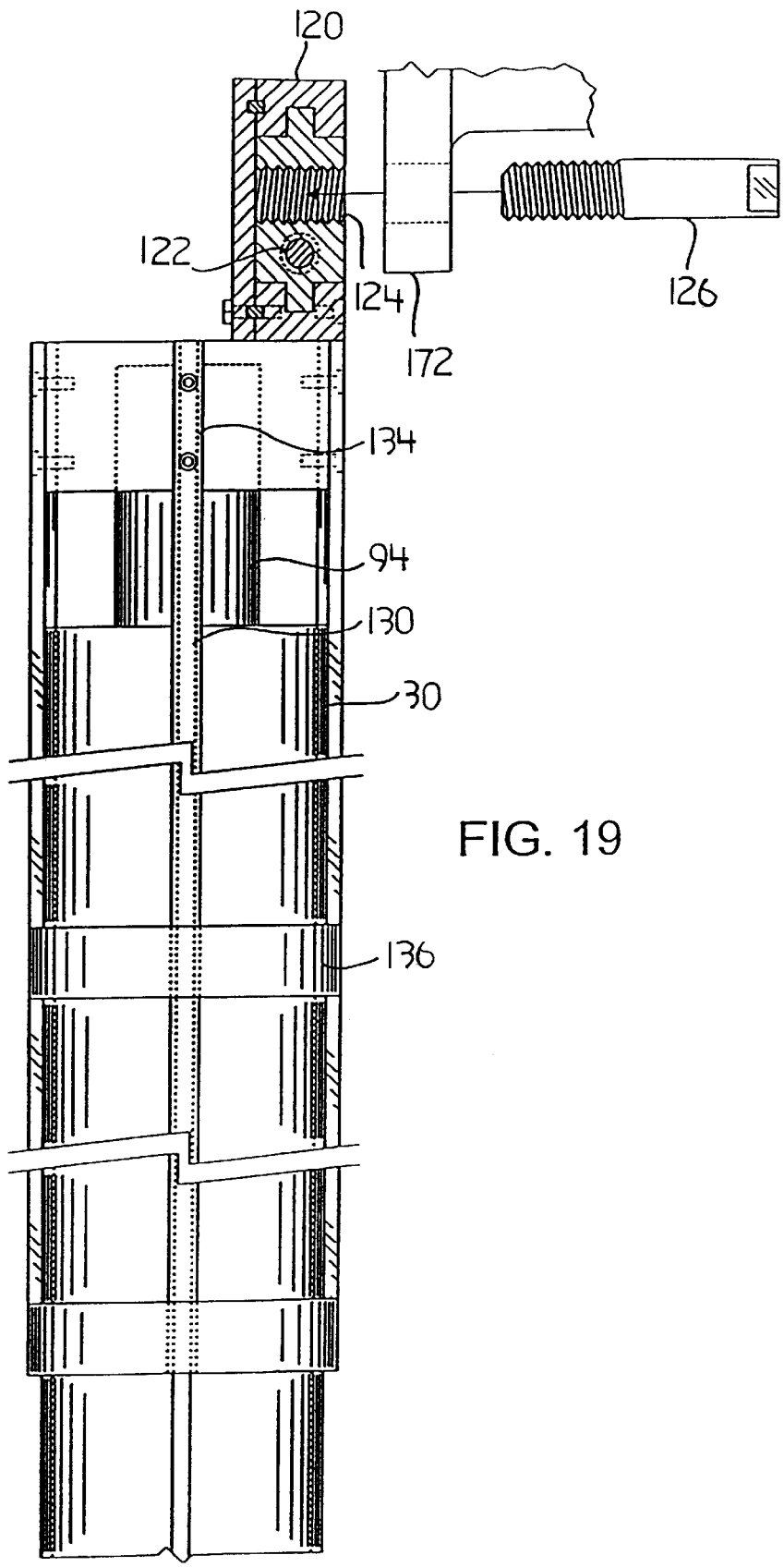
FIG. 19 is a side elevation view, in section, of the mounting bar workpiece engaging member from the workpiece support apparatus illustrated in FIG. 13.

Referring to FIG. 1, after primary support columns 30 and secondary support columns 76 have been properly positioned, then an appropriate work piece engaging member 96 for each particular type of workpiece 172 will need to be selected and then mounted on top mounted adapter 94 of each of primary support columns 30 and secondary support columns 76. Referring to FIGS. 8 and 12, if for example, workpiece 172 is a pipe, then "v" shaped workpiece engaging member 98 would be mounted on top mounting adapted 94 to support the workpiece 172. The difference between FIG. 8 and FIG. 12 is that FIG. 12 depicts "v" shaped workpiece engaging member 98 mounted on top mounting adapter 94 of primary support column 30 that has shorter height than primary support column 30 depicted in FIG. 8. Referring to FIG. 7, a workpiece 172 that is a horizontal flange face would require a table style workpiece engaging member 100 to be mounted on top mounting adapter 94. While table top style workpiece engaging member 100 is depicted as being triangular, other shapes can also be used. Referring to FIG. 13, for workpiece 172 that is a vertical flange face, a mounting bar attachment 102 would be most suitable. Referring to FIG. 19, mounting bar attachment 102 may require further adjustment of the spacing of blocks 120 so that projecting pins 126 can be accurately inserted through both pinholes 124 of blocks 120 and pinholes 124 of workpiece 172 to secure workpiece 172 to mounting bar attachment 102.

Referring to FIG. 1, the next step involves adjusting the heights of both primary support columns 30 and secondary support columns 76 to ensure that the proposed intersections 172 of trunk lines 174 with branch lines 176 are at the required elevation. Referring to FIGS. 3 and 9, in order to adjust the height of primary support columns 30 and secondary support columns 76, fluid activated telescopically extendible cylinders are activated with fluid through fluid lines 154.

Referring to FIG. 1, once primary support columns 30 have been adjusted to the appropriate position and height, trunk line 174 and branch line 176 can be placed on workpiece support apparatus 10. To ensure that each branch line 176 is properly aligned with trunk line 174 further adjustment may be required. Referring to FIG. 3, each of primary support columns 30 can be levelled through use of screw levelling adjustment 84. Once level, primary support columns 30 will generally remain level unless the equipment is moved or sustains an impact. Referring to FIG. 9, once secondary support columns 76 have been adjusted to the proper height, the same means can be used to level secondary support columns 76. Although the levelling means in FIGS. 3 and 9 is illustrated as being screw levelling adjustment 84, it will be appreciated that other forms of levelling adjustment may also be functional.

Referring to FIG. 1, if further support is required to support workpiece 172, support extension 138 can be used. Support extension 138 can be coupled to either primary support column 30 or secondary support column 76.

With workpiece support apparatus 10 at the proper settings and positions so that trunk lines 174 and branch lines 176 are accurately aligned, workpiece 172 is then able to be held securely while welding to join branch line 176 to trunk line 174 is completed.

Once the teachings of the present invention are understood, it will be apparent to one skilled in the art that workpiece support apparatus 10 could be equipped with more sophisticated computer controls. Computer controls would set the alignment of workpiece support apparatus 10 directly from a computer assisted drawing program. This would speed up the set up time for the equipment and eliminate the possibility of human error. It will also be understood that as the applications for workpiece support apparatus 10 is expanded, further workpiece engaging members 96 may have to be developed to ensure that workpieces having unusual shapes are properly supported.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A workpiece support apparatus, comprising:
   an elongate primary body;
   several height adjustable primary support columns extending vertically from the primary body;
   at least one arm extending radially from and being pivotally secured to the primary body, the at least one arm pivoting about a substantially vertical axis for angular adjustment on a substantially horizontal plane, and means being provided for locking the at least one arm in a selected angular position; and
   at least two height adjustable secondary support columns extending vertically from the at least one arm.

2. The workpiece support apparatus as defined in claim 1, wherein some of the primary support columns are axially movable along the primary body.

3. The workpiece support apparatus as defined in claim 2, wherein the primary body has a longitudinally extending track, and each of the primary support columns has a base with means for engaging the track.

4. The workpiece support apparatus as defined in claim 1, wherein at least one of the secondary support columns is axially movable along the arm.

5. The workpiece support apparatus as defined in claim 1, wherein the primary support columns are fluid activated telescopically extendible cylinders provided with fluid through fluid lines.

6. The workpiece support apparatus as defined in claim 5, wherein the fluid extend from each of the primary support columns to a rotary fluid manifold, upon rotation of the rotary fluid manifold in a first direction fluid lines are wound onto the rotary fluid manifold, upon rotation of the rotary fluid manifold in a second direction fluid lines are fed from the rotary fluid manifold.

7. The workpiece support apparatus as defined in claim 6, wherein each of the fluid lines is segregated by means of radially extending dividers positioned on the rotary fluid manifold.

8. The workpiece support apparatus as defined in claim 6, wherein rotation of the rotary fluid manifold is controlled by a spring loaded recoiler.

9. The workpiece support apparatus as defined in claim 5, wherein a plurality of direction altering rollers are used to route the fluid lines along the primary body.

10. The workpiece support apparatus as defined in claim 1, wherein means is provided for levelling each of the primary support columns.

11. The workpiece support apparatus as defined in claim 1, wherein alignment means are provided for aligning each of the primary support columns axially along the primary body.

12. The workpiece support apparatus as defined in claim 1, wherein the at least one arm has underlying rollers.

13. The workpiece support apparatus as defined in claim 12, wherein each of the underlying rollers are spring mounted to a housing, the rollers having an extended position extending from the housing and a retracted position retracted within the housing, the rollers normally being in the extended position, the rollers assuming the retracted position when a load is applied that overcomes the biasing force of the spring mounting.

14. The workpiece support apparatus as defined in claim 1, wherein each of the primary support columns has a top mounting adaptor adapted to receive a workpiece engaging member.

15. The workpiece support apparatus as defined in claim 14, wherein a rigidifying frame is provided and each of the primary support columns has longitudinally extending grooves which receives bars of the rigidifying frame to provide lateral stability to the workpiece engaging member when mounted on the top mounting adaptor.

16. The workpiece support apparatus as defined in claim 14, wherein several alternative workpiece engaging members having differing support characteristics are provided for the top mounting adaptors.

17. A workpiece support apparatus, comprising:
   an elongate channel-form primary body having a first end, a second end, a longitudinal axis, a first sidewall and a second sidewall;
   tracks extending longitudinally along each of the first sidewall and the second sidewall of the primary body;
   several height adjustable primary support columns extending vertically from the primary body, each of the primary support columns having a base with rollers that engage the tracks of the primary body for axial movement along the primary body whereby the primary support columns are selectively positioned;
   elongate channel-form arms extending radially from and being pivotally secured to each of the first sidewall and the second sidewall of the primary body, each of the arms pivoting about a substantially vertical axis for angular adjustment on a substantially horizontal plane, each of the arms having a first end, a second end, a longitudinal axis, a first sidewall and a second sidewall;
   tracks extending longitudinally along the first sidewall and the second sidewall of each of the arms;
   height adjustable secondary support columns extending vertically from each arm, each of the secondary support columns having a base with rollers that engage the tracks of the arms for axial movement along the arms whereby the secondary support columns are selectively positioned.

18. The workpiece support apparatus as defined in claim 17, wherein means is provided for levelling each of the primary support columns and each of the secondary support columns.

19. The workpiece support apparatus as defined in claim 17, wherein each of the primary support columns and each of the secondary support columns are fluid activated telescopically extendible cylinders supplied with fluid through fluid lines.

20. The workpiece support apparatus as defined in claim 19, wherein the fluid lines extend from each of the primary support columns to a rotary fluid manifold, upon rotation of the rotary fluid manifold in a first direction fluid lines are wound onto the rotary fluid manifold, upon rotation of the rotary fluid manifold in a second direction fluid lines are fed from the rotary fluid manifold.

21. The workpiece support apparatus as defined in claim 20, wherein each of the fluid lines is segregated by means of a radially extending divider positioned on the rotary fluid manifold.

22. The workpiece support apparatus as defined in claim 20, wherein rotation of the rotary fluid manifold is controlled by a spring loaded recoiler.

23. The workpiece support apparatus as defined in claim 19, wherein a plurality of direction altering rollers are used to route the fluid lines along the primary body.

24. The workpiece support apparatus as defined in claim 17, wherein alignment means are provided for aligning each of the primary support columns along the longitudinal axis of the primary body.

25. The workpiece support apparatus as defined in claim 17, wherein each of the arms has underlying rollers.

26. The workpiece support apparatus as defined in claim 25, wherein each of the underlying rollers are spring mounted to a housing, the rollers having an extended position extending from the housing and a retracted position retracted within the housing, the rollers normally being in the extended position, the rollers assuming the retracted position when a load is applied that overcomes the biasing force of the spring mounting.

27. The workpiece support apparatus as defined in claim 17, wherein means are provided for locking the arms in a selected angular position.

28. The workpiece support apparatus as defined in claim 17, wherein each of the primary support columns and each of the secondary support columns has a top mounting adaptor adapted to receive a workpiece engaging member.

29. The workpiece support apparatus as defined in claim 28, wherein several alternative workpiece engaging members having differing support characteristics are provided for the top mounting adaptors.

30. The workpiece support apparatus as defined in claim 28, wherein a rigidifying frame is provided and each of the primary support columns has longitudinally extending grooves which receives bars of the rigidifying frame to provide lateral stability to the workpiece engaging member when mounted on the top mounting adaptor.

31. A workpiece support apparatus, comprising:

an elongate channel-form primary body having a first end, a second end, a longitudinal axis, a first sidewall and a second sidewall;

tracks extending longitudinally along each of the first sidewall and the second sidewall of the primary body;

several height adjustable primary support columns extending vertically from the primary body, each of the primary support columns having a base with adjustable rollers that engage the tracks of the primary body for axial movement along the primary body whereby the primary support columns are selectively positioned;

laser alignment targets being provided on each of the primary support columns for aligning the primary support columns in a straight and level orientation along the longitudinal axis of the primary body;

elongate channel-form arms extending radially from and being pivotally secured at pivotal connections to each of the first sidewall and the second sidewall of the primary body, each of the arms pivoting about a substantially vertical axis for angular adjustment on a substantially horizontal plane, each of the arms having a first end, a second end, a longitudinal axis, a first sidewall and a second sidewall, each of the arms having underlying rollers, the pivotal connections having several apertures, the arms being locked in a selected angular position by inserting a locking pin into one of the several apertures;

tracks extending longitudinally along the first sidewall and the second sidewall of each of the arms;

height adjustable secondary support columns extending vertically from each arm, each of the secondary support columns having a base with adjustable rollers that engage the tracks of the arms for axial movement along the arms whereby the secondary support columns are selectively positioned;

each of the primary support columns and each of the secondary support columns having a screw levelling adjustment;

each of the primary support columns and each of the secondary support columns having a top mounting adaptor adapted to receive a workpiece engaging member;

each of the primary support columns and each of the secondary support columns being fluid activated telescopically extendible cylinders supplied with fluid through fluid lines, the fluid lines extend from each of the primary support columns to a rotary fluid manifold, upon rotation of the rotary fluid manifold in a first direction fluid lines are wound onto the rotary fluid manifold, upon rotation of the rotary fluid manifold in a second direction fluid lines are fed from the rotary fluid manifold, a plurality of direction altering rollers being used to route the fluid lines along the primary body.

32. The workpiece support apparatus as defined in claim 31, wherein each of the fluid lines is segregated by means of a radially extending divider positioned on the rotary fluid manifold.

33. The workpiece support apparatus as defined in claim 31, wherein rotation of the rotary fluid manifold is controlled by a spring loaded recoiler.

34. The workpiece support apparatus as defined in claim 31, wherein each of the underlying rollers are spring mounted to a housing, the rollers having an extended position extending from the housing and a retracted position retracted within the housing, the rollers normally being in the extended position, the rollers assuming the retracted position when a load is applied that overcomes the biasing force of the spring mounting.

35. The workpiece support apparatus as defined in claim 31, wherein several alternative workpiece engaging members having differing support characteristics are provided for the top mounting adaptors.

36. The workpiece support apparatus as defined in claim 31, wherein a rigidifying frame is provided and each of the primary support columns has longitudinally extending grooves which receives bars of the rigidifying frame to provide lateral stability to the workpiece engaging member when mounted on the top mounting adaptor.

\* \* \* \* \*